United States Patent
Ylonen

(10) Patent No.: US 7,937,419 B2
(45) Date of Patent: May 3, 2011

(54) GARBAGE COLLECTION VIA MULTIOBJECTS

(75) Inventor: Tatu J. Ylonen, Espoo (FI)

(73) Assignee: Tatu Ylonen Oy, Espoo (FI)

( * ) Notice: Subject to any disclaimer, the term of this patent is extended or adjusted under 35 U.S.C. 154(b) by 440 days.

(21) Appl. No.: 12/147,419

(22) Filed: Jun. 26, 2008

(65) Prior Publication Data

US 2009/0327372 A1 Dec. 31, 2009

(51) Int. Cl.
*G06F 12/00* (2006.01)
*G06F 17/30* (2006.01)

(52) U.S. Cl. ................................................ 707/813
(58) Field of Classification Search .................... None
See application file for complete search history.

(56) References Cited

U.S. PATENT DOCUMENTS

| | | | |
|---|---|---|---|
| 6,480,862 B1 | 11/2002 | Gall | |
| 6,763,440 B1 * | 7/2004 | Traversat et al. | 711/159 |
| 2004/0078381 A1 | 4/2004 | Blandy et al. | |
| 2004/0168030 A1 * | 8/2004 | Traversat et al. | 711/133 |
| 2004/0215880 A1 | 10/2004 | Chilimbi et al. | |
| 2005/0138092 A1 | 6/2005 | Abuaiadh et al. | |
| 2006/0294165 A1 * | 12/2006 | Bacon et al. | 707/206 |

OTHER PUBLICATIONS

Marlow, Simon et al: Parallel Generational-Copying Garbage Collection with a Block-Structured Heap, ISMM'08, pp. 11-20, ACM, 2008.
Wilson, Paul R. et al: Effective "Static-graph" Reorganization to Improve Locality in Garbage-Collected Systems, ACM SIGPLAN'91 Conference, ACM, 1991, pp. 177-191.
Siegwart, David. Improving locality with parallel hierarchical copying GC. International symposium on memory management, pp. 52-63, ACM, 2006.
Detlefts, David et al: Garbage-First Garbage Collection. International symposium on memory management, pp. 37-48, ACM, 2004.
Written Opinion of the International Preliminary Examining Authority dated Jun. 14, 2010.
International Preliminary Report on Patentability, Sep. 28, 2010.
International search report dated Sep. 9, 2008.
Arguments submitted with PCT Demand Oct. 28, 2008.

* cited by examiner

*Primary Examiner* — Uyen T. Le

(57) ABSTRACT

Computer system, method and article of manufacture for garbage collection in computer systems that combines individual objects into linearized trees called multiobjects and thereafter utilizes multiobjects to implement most memory management operations such as detection of dead objects and compaction without the need to inspect individual objects, thereby improving performance and reducing power consumption.

24 Claims, 24 Drawing Sheets

2401 COMPUTER READABLE SOFTWARE DISTRIBUTION MEDIUM

2402 PROGRAM CODE MEANS

2403 PROGRAM CODE MEANS FOR GARBAGE COLLECTION

FIG 24

GARBAGE COLLECTION VIA MULTIOBJECTS

CROSS-REFERENCE TO RELATED APPLICATIONS

Not Applicable

INCORPORATION-BY-REFERENCE OF MATERIAL SUBMITTED ON ATTACHED MEDIA

Not Applicable

TECHNICAL FIELD

The present invention relates to garbage collection techniques for automatic memory management in a computer system, particularly garbage collection for very large multi-threaded applications with heap sizes up to tens or hundreds of gigabytes running on high-performance shared memory multiprocessor computers, and garbage collection for power-constrained mobile devices.

BACKGROUND OF THE INVENTION

Automatic memory management, or garbage collection, is a mature field that has been studied for about fifty years. An extensive survey of garbage collection is provided by the book 'Garbage Collection: Algorithms for Dynamic Memory Management' by R. Jones and R. Lins (Wiley, 1996). This book is basic reading for anyone skilled in the art of garbage collection. Even since the publication of this book, the field has seen active development due to the significant commercial interest in Java and other similar virtual machine based programming environments.

Another reference that generally should be reviewed when considering whether something is new in garbage collection is Bishop: Computer Systems with a Very Large Address Space and Garbage Collection, MIT/LCS/TR-178, MIT, 1977; NTIS ADA040601. While an old reference, it laid the groundwork for modern garbage collectors that operate on large memories incrementally by dividing the memory into regions (called areas by Bishop), and many patents have been granted in recent years where it may serve as invalidating prior art. It touches concepts such as regions (areas), remembered sets (inter-area links), generations (cables), concurrency (multiple simultaneous collections), multiple-area cycles, read barriers (load operation), write barriers (store operation), selecting which regions to collect next.

Much of the recent work in garbage collection has been driven by the need to make Java scale to server environments where applications have working sets of hundreds of megabytes or even several gigabytes, utilize multiple threads, and cannot tolerate pause times of more than some tens of milliseconds.

The Garbage-First collector, as described in Detlefs et al: Garbage-First Garbage Collection, ISMM'04, pp. 37-48, ACM, 2004, which is hereby incorporated herein by reference, can be considered representative of modern garbage collectors. It divides the heap into regions that can be collected independently, maintains remembered sets to know which objects in a region are referenced from outside the region, uses card marking to coarsely keep track of which memory locations have been written into between evacuation pauses, uses a parallel copying collector to copy and compact live objects in regions, uses metrics to decide which regions to collect next and uses global snapshot-at-the-beginning tracing running mostly concurrently with mutators to identify garbage data structures spanning multiple regions. Tracing takes place on the individual object level. Garbage collection is performed during evacuation pauses, which are short (typically less than 50 ms) pauses when mutator activity is stopped in order to perform garbage collection on one or more memory regions, typically also including a young object area.

The work of Siegwart and Hirzel: Improving Locality with Parallel Hierarchical Copying GC, ISMM'06, pp. 52-63, ACM, 2006, which is hereby included herein by reference, is representative of work on clustering objects during garbage collection to improve memory access locality. Their paper shows how to reduce cache and TLB misses by changing the order in which a parallel garbage collector copies heap objects. They also discuss various copy orders, such as breath first, depth first, and hierarchical copy order.

Systems where memory is divided into multiple independently collected regions need to be able to update references to objects to point to their new locations when objects are moved. Some systems use an indirection data structure that is updated when an object is moved. Most modern systems use a data structure called remembered set, which lists for each independently collectable region the set of objects in it that are referenced from outside the region and identifies for each such object the memory locations outside that region that contain those references, so that the referring memory locations can be updated when the object is moved. In many systems only some references are maintained; in Bishop, a data structure called cable is used to limit references; in generational garbage collectors, references from younger to older generations are not generally tracked; and in the train collector, references to higher numbered cars of a train are not tracked. In most collectors, references from the young object area (nursery) to older objects are not maintained in the remembered sets. Many systems do not track references to popular objects.

Existing systems generally only use the remembered set data structures for tracking references that cross region boundaries (including node boundaries in distributed systems). This is mandated by the fact that typical objects are small (e.g., a list node is usually 8-24 bytes) in comparison to the remembered set data structures, and the overhead of maintaining such data structures on a per-object basis would be prohibitive.

Detection and collection of garbage cycles spanning multiple regions is an important problem in garbage collection. Most known systems detect such garbage by tracing the entire heap object-by-object, with suitable bookkeeping (including special code in the write barrier) to implement snapshot-at-the-beginning or incremental-update tracing. The train algorithm of Hudson & Moss, and in Bishop method, on the other hand, detect such cycles by eventually moving all objects belonging to the same cycle to a single area (Bishop) or train (Hudson&Moss), after which the cycle can be detected as garbage. In distributed systems garbage cycles spanning multiple nodes are reclaimed either using a centralized server or by using a protocol that transmits either reference lists or timestamps between servers. The references lists may be compressed, and may only include references between externally referenced objects. Locally within nodes, such systems operate on a per-object level and perform object-level tracing to discover which external objects are reachable from which externally referenced objects.

The state of the art in local garbage collection could be summarized so that tracing is performed on a per-object basis and in parallel by multiple threads, soft real-time performance has been achieved with reasonably large memories (up to several gigabytes), snapshot-at-the-beginning concurrent tracing algorithms (or various other forms of tracing that run concurrently with mutator execution) allow detecting garbage cycles spanning multiple regions, and various metrics are used for priorizing regions for collection.

BRIEF SUMMARY OF THE INVENTION

The present invention is based on organizing many individual objects into larger groups called multiobjects, and rather than maintaining traditional remembered sets between individual objects, maintaining remembered sets between multiobjects, and using multiobjects for implementing various garbage collection operations.

A multiobject is a linearized tree of objects with one entry point and any number of exits. The objects in a multiobject are preferably stored in a specific order (such as left-to-right depth first order). Within a multiobject, there are no cycles or objects with multiple references.

According to the invention, a computing system determines, in at least some situations, which objects in a nursery memory area area are live; selects some objects to be grouped together to form a multiobject, at least some of the groups thus formed containing more than one object; constructs a multiobject by copying the objects selected to form the multiobject into consecutive memory locations, determines which multiobjects are live, and utilizes multiobjects in at least some memory management operations.

In many applications with very large memories, data structures tend to organize very nicely as multiobjects. There are small-to-medium sized clusters of information, each consisting of many objects, that have only one reference from the outside (to the representative object of the overall information cluster) and relatively few references to the outside (except to popular objects).

In the preferred embodiment, remembered set data structures are maintained between all multiobjects (except popular multiobjects), even if they reside in the same independently collectable memory region. This is contrary to the teachings of the prior art, where much effort has been put on minimizing the size of the remembered sets. However, since multiobjects are typically much larger than individual objects (multiobjects of many kilobytes to tens of kilobytes are common), the memory overhead of maintaining remembered sets between all multiobjects is small—typically a few percent of the size of the objects—though this depends on the application.

Applications with many data structures having a single entry point, such as the per-user or per-session data in many server applications, per-document, per-computer, or per-product information in business applications, the representations of instances and concepts in many knowledge bases, logical formulas in theorem provers, and generally any data structures in functional programs, behave best with the methods of this invention, whereas applications where most of the memory consists of a densely linked cyclic graph suffer notable memory overhead (though even in the worst applications still usually less than the overhead of standard two-space copying collection).

Once data has been organized into multiobjects, many garbage collection operations can be performed very efficiently. A bottleneck in many applications is garbage collection for the mature object space, especially as knowledge-intensive applications grow to utilize extremely large heaps of tens to hundreds of gigabytes. The present invention particularly helps with managing the mature object space.

First, existing multiobjects can be copied without tracing, which makes copying many times more efficient than any known method for copying old-space objects.

A second benefit of the present invention relates to detection of garbage cycles spanning multiple regions. In the preferred embodiment of this invention, such garbage is detected without any object-level tracing at all (except for the nursery). The basic algorithm is to compute a multiobject-level transitive closure of the root nodes using a multiobject-level reachability relation (which is recorded in the remembered sets).

Furthermore, because the transitive closure computation can be performed entirely using the remembered set data structures, without touching the actual objects on the heap at all, it can easily be made to run concurrently with mutator execution. There is no need to include code in the write barrier for buffering writes for SATB marking, as in e.g. Detleffs et al (2004). The transitive closure computation is totally unaffected by the mutators, and vice versa. The transitive closure can also be allowed to run during garbage collection. Only when the remembered sets are updated needs the transitive closure be taken into account. Either snapshot-at-the-beginning or incremental-update semantics can be maintained between remembered set updates and the transitive closure computation.

A third, and perhaps most significant benefit of this invention in some applications is savings in power consumption. As the memory sizes on mobile and portable computing devices grow, and they increasingly use programming environments utilizing garbage collection (such as the Java language and its associated run-time environments), performing SATB marking becomes increasingly expensive. Even if processing cycles were available for performing SATB marking non-disruptively on the object level, it is a process that performs a huge number of memory accesses and uses a significant amount of electrical power. The transitive closure on the multiobject level makes orders of magnitude fewer memory accesses and runs orders of magnitude faster, thus reducing power consumption.

Finally, since full remembered sets are preferably maintained for all (non-popular) multiobjects, any multiobject can be moved independently of any other multiobject. There is no need to evacuate an entire region at a time; instead, any multiobject can be copied any time in any order. This allows issues such as locality of data and expected lifetime of the multiobject to be better taken into account, thus resulting in faster program execution and reduced garbage collection overhead. This may also be advantageous in real-time collection.

In summary, the present invention significantly improves old space copying performance and makes detection of cross-region cyclic garbage extremely fast compared to traditional global tracing solutions (by as much as a factor of 100), while significantly reducing memory bandwidth requirements and power consumption. These improvements are all important both large-scale computing systems as well as in mobile computing devices.

BRIEF DESCRIPTION OF THE SEVERAL VIEWS OF THE DRAWING(S)

Figure 5:
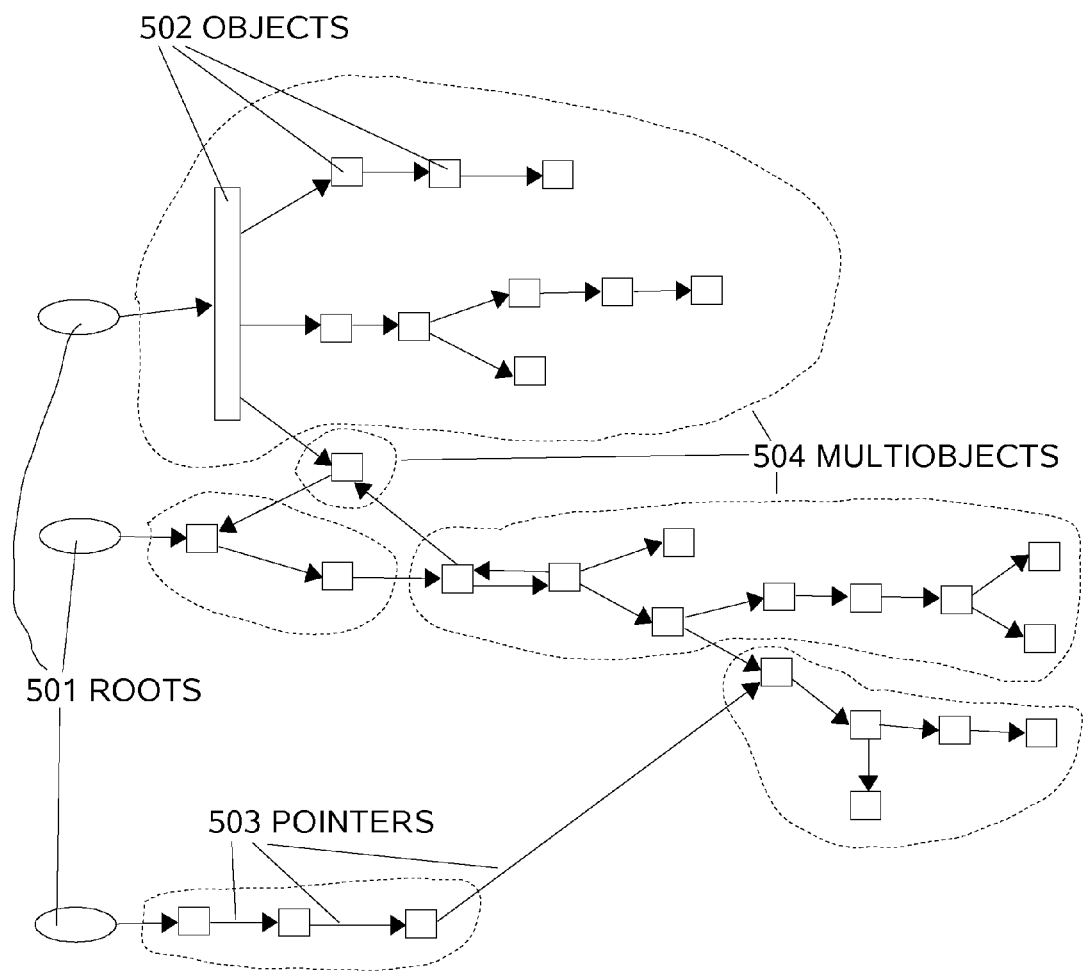
FIG. 5 illustrates the grouping of objects into groups from which multiobjects will later be constructed.
Figure 6:
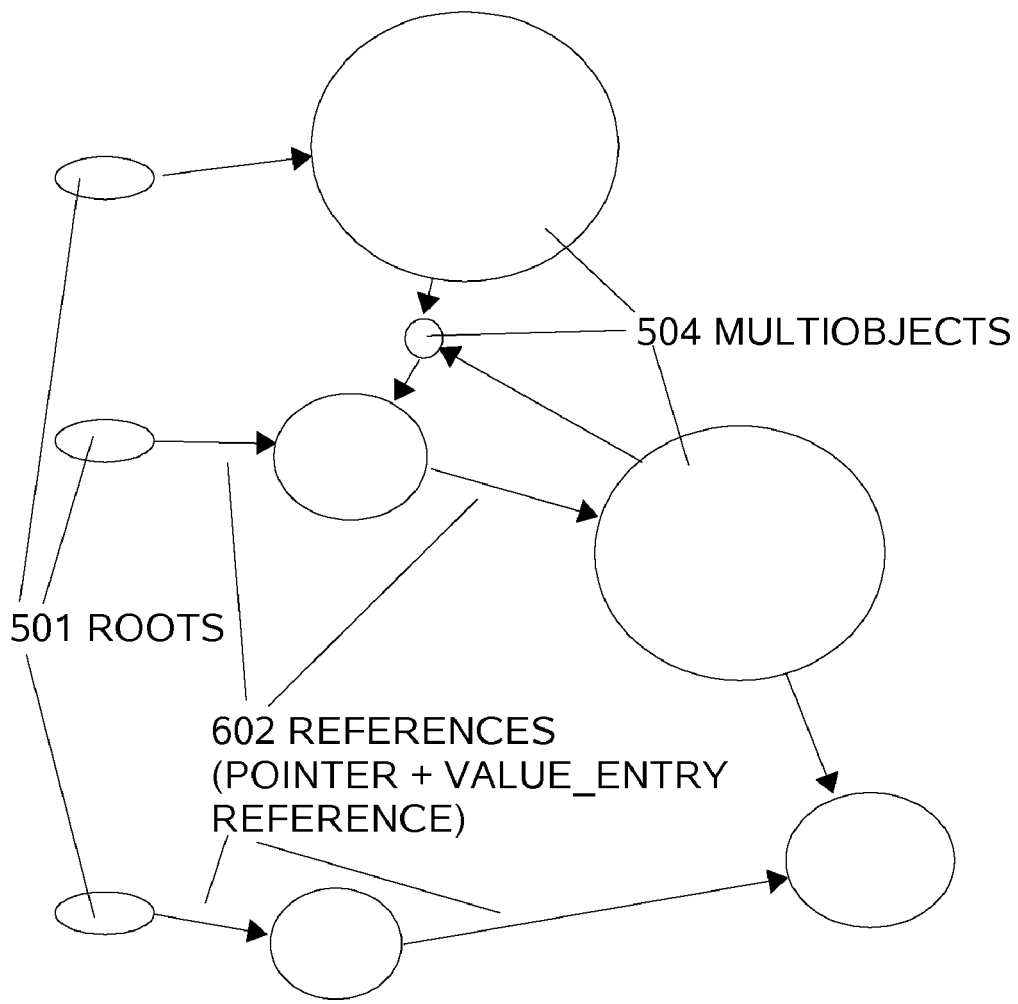

FIG. 6. illustrates the multiobjects constructed from the objects and groups in FIG. 5.

Figure 7:
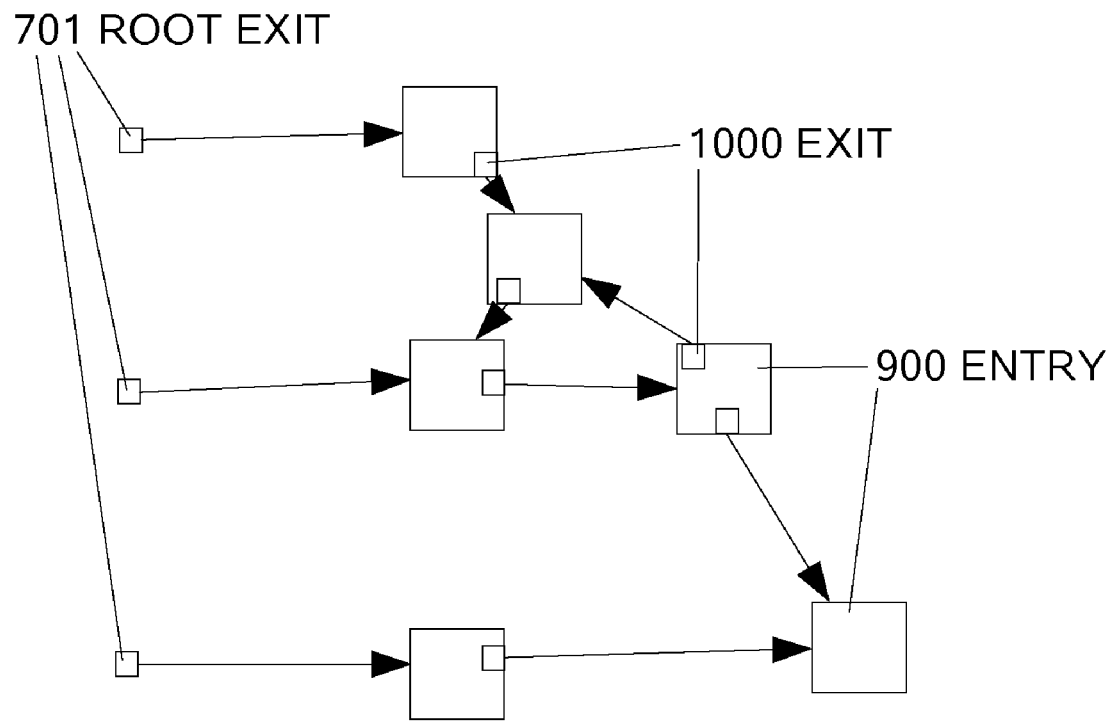

FIG. 7 illustrates the remembered set structure (entries and exits) for the multiobjects in FIG. 6 (not showing the refexits list for clarity).

Figure 8:
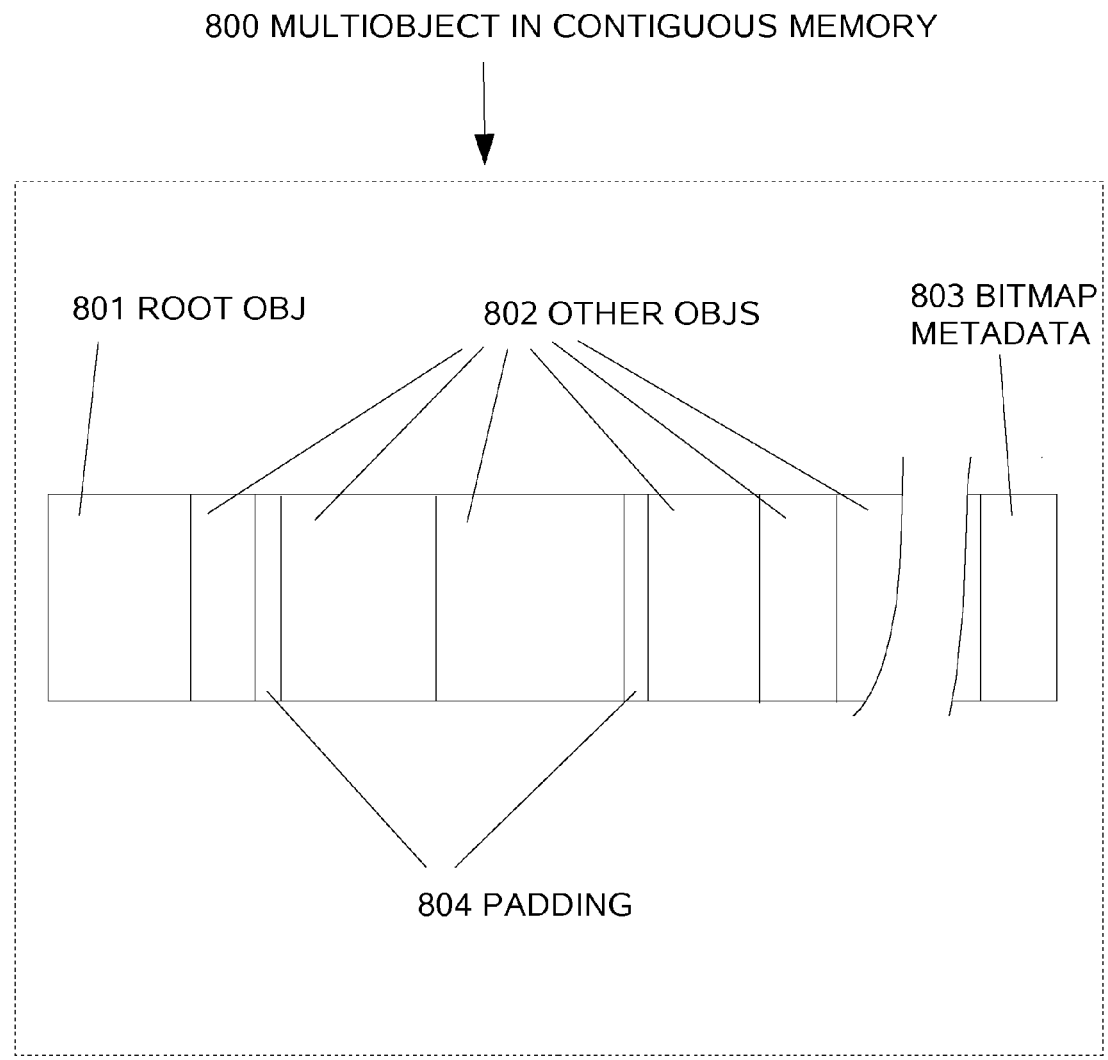

FIG. 8 illustrates the preferred layout of a multiobject in a contiguous memory area.

Figure 9:
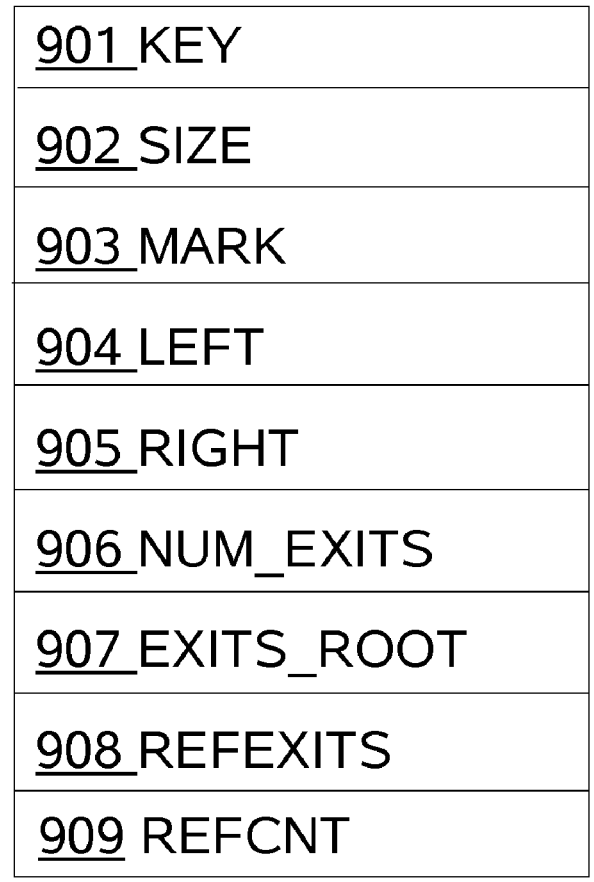

FIG. 9 illustrates the contents of the entry data structure in the preferred embodiment.

Figure 10:
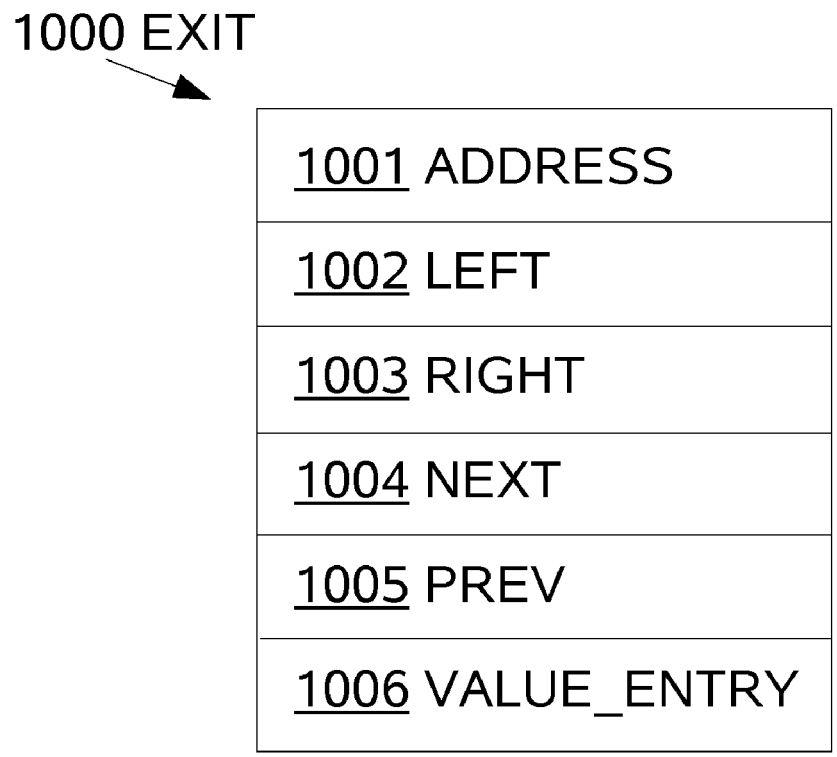

FIG. 10 illustrates the contents of the exit data structure in the preferred embodiment.

Figure 11:
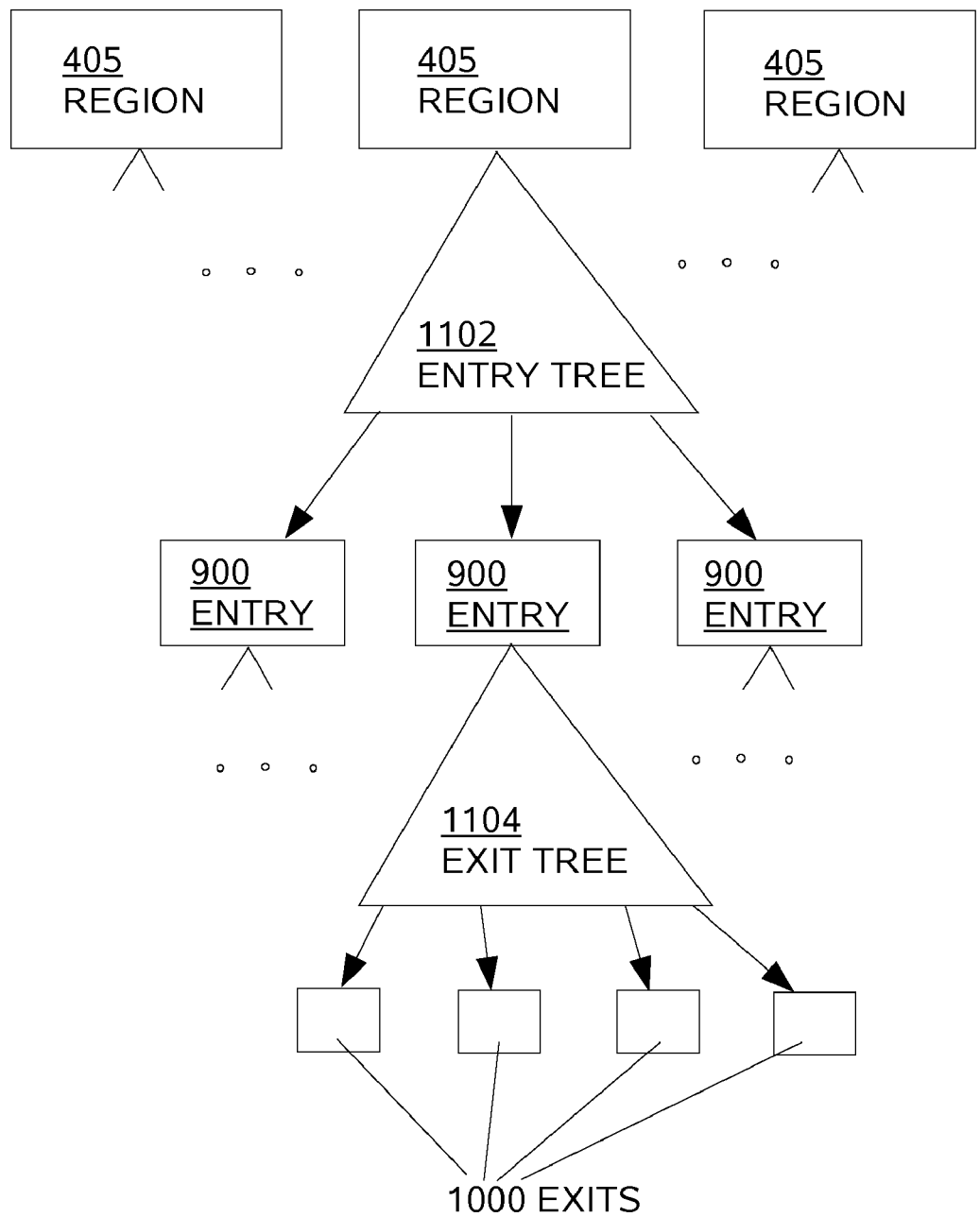

FIG. 11 illustrates how entries are attached to regions using an index data structure and exits to entries using another index data structure in the preferred embodiment.

Figure 12:
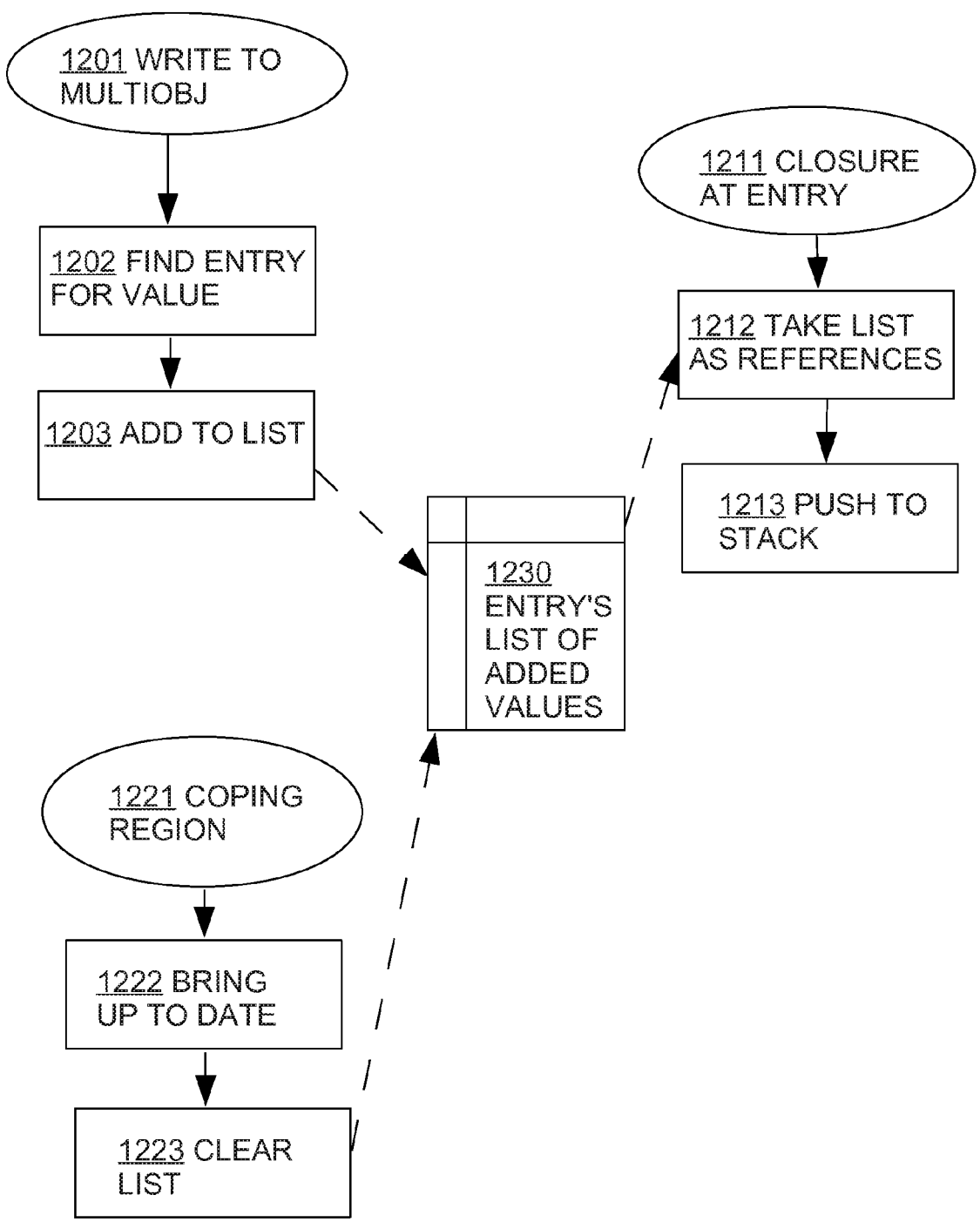

FIG. 12 contains flowcharts and data illustrating a means of managing remembered sets inexactly (overgeneralizing).

Figure 13:
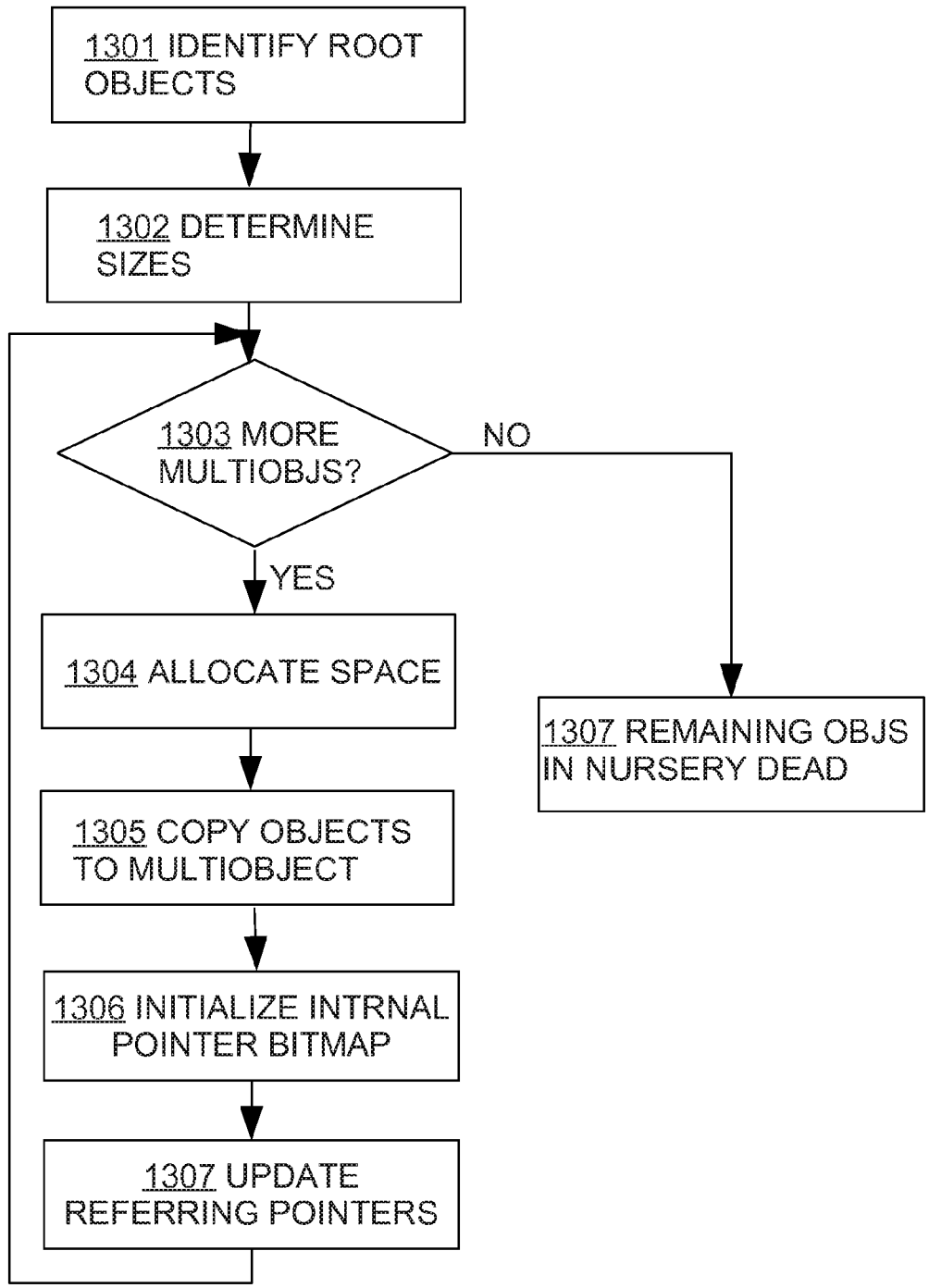

FIG. 13 illustrates the overall construction of multiobjects from a nursery memory area (as defined in the specification) in the preferred embodiment.

Figure 14:
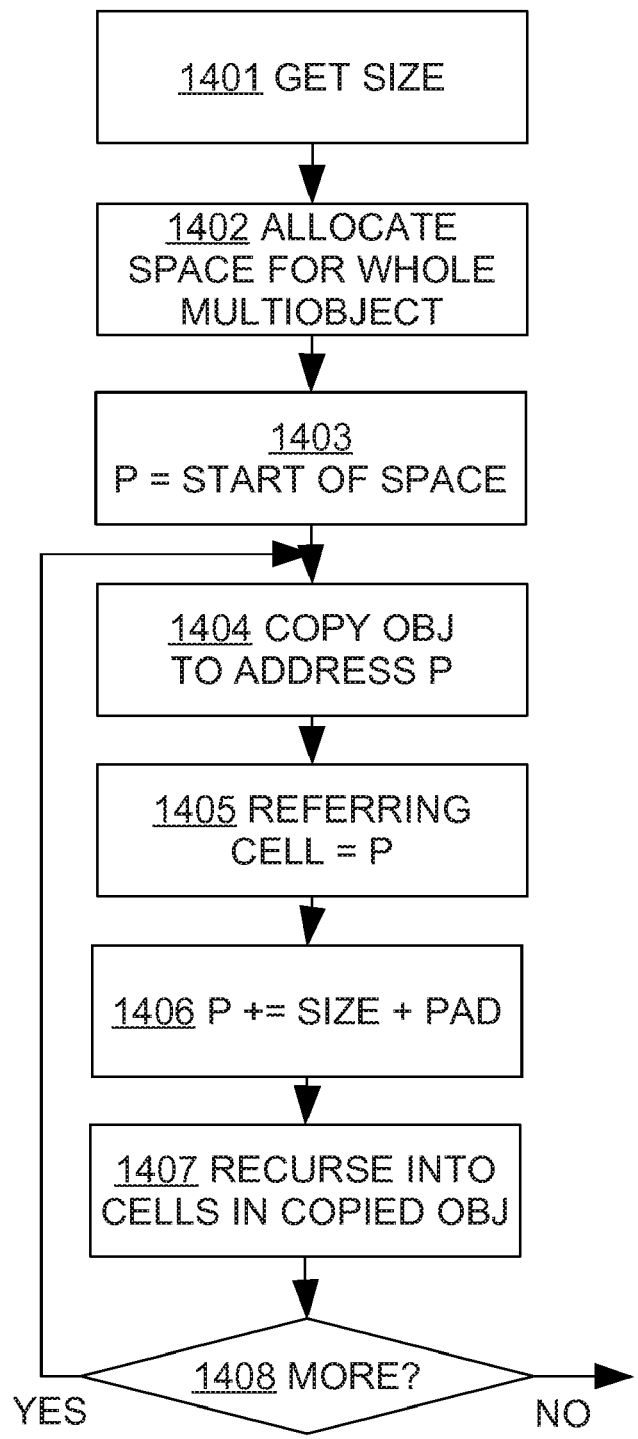

FIG. 14 illustrates copying of objects into a multiobject when space has been allocated for the entire multiobject in advance.

Figure 15:
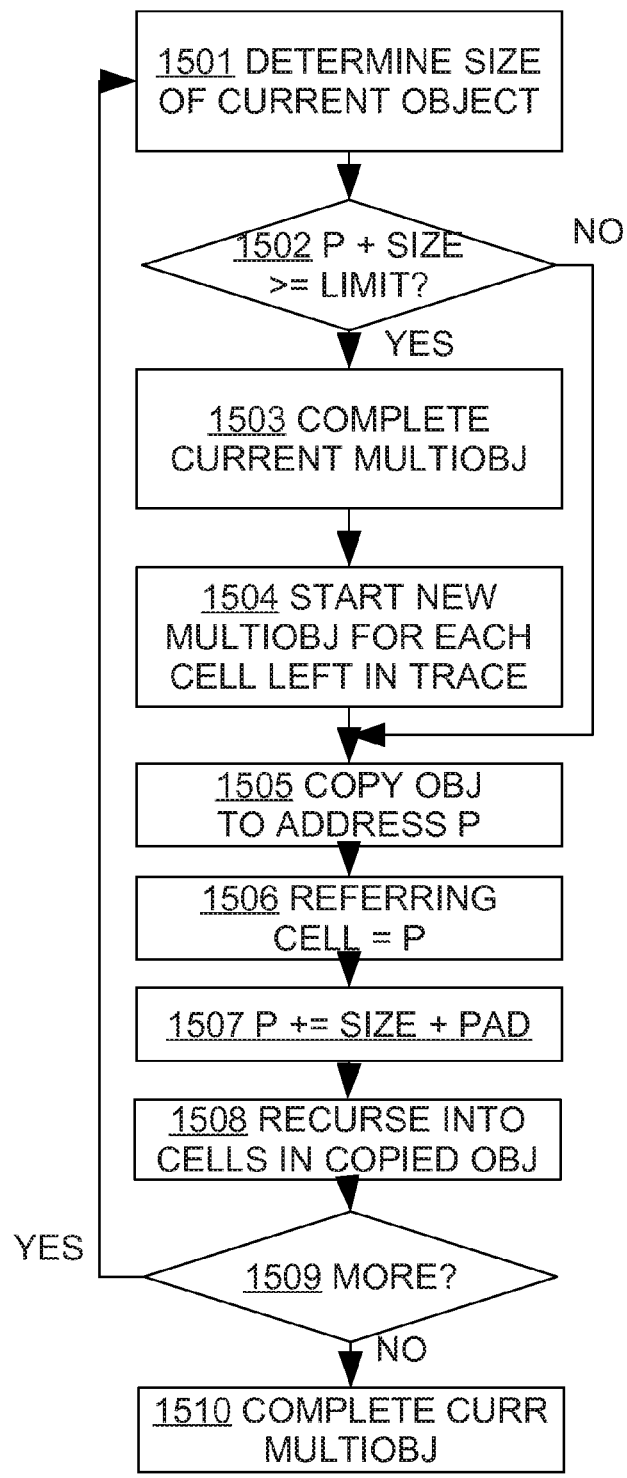

FIG. 15 illustrates copying of objects into multiobject(s) when space is allocated for each object separately.

Figure 16:
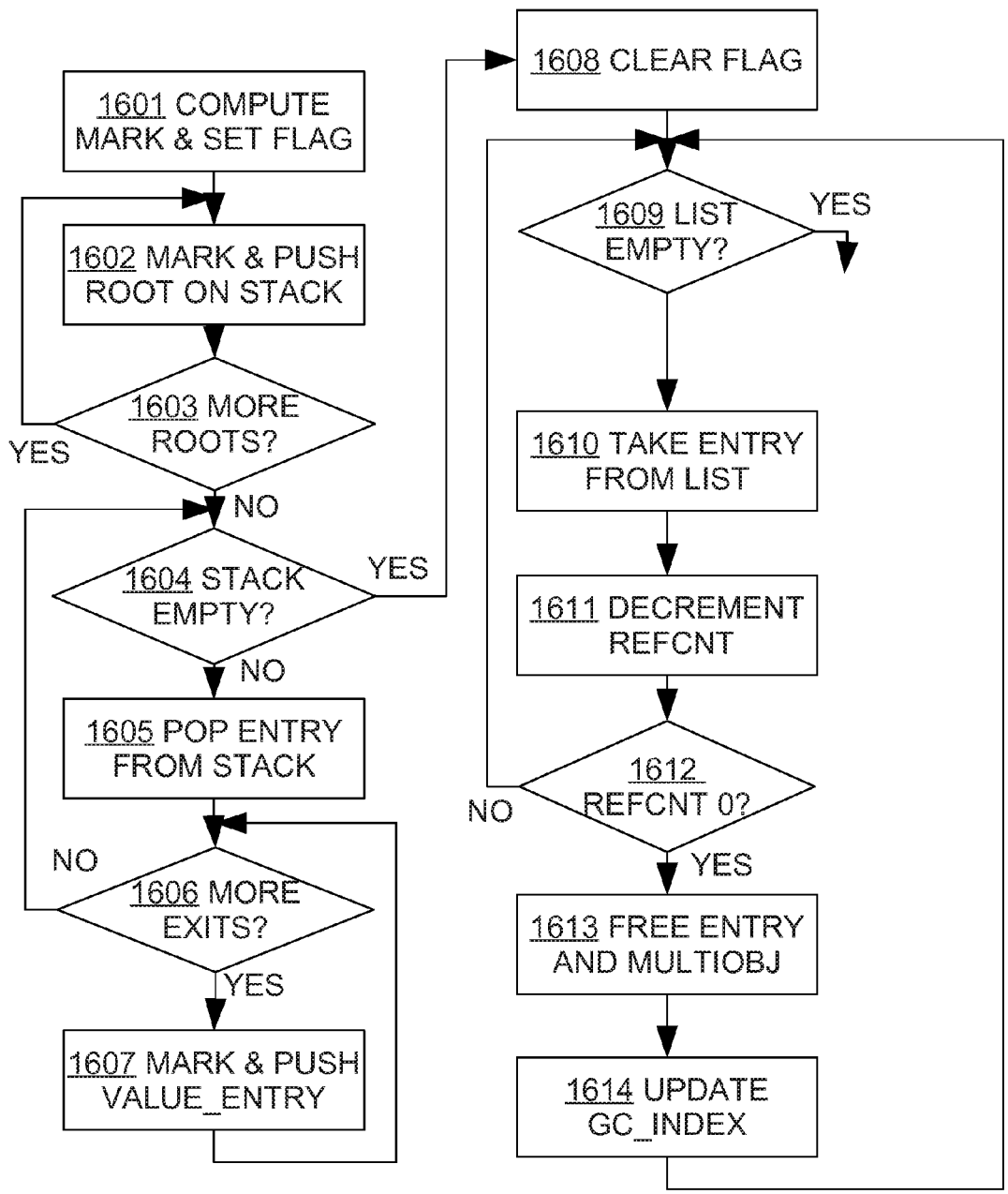

FIG. 16 illustrates the steps of computing the transitive closure in the preferred embodiment (for the transitive closure computation) and a doubly linked list based method of freeing unreachable multiobjects (which is an alternative to the simpler preferred embodiment).

Figure 17:
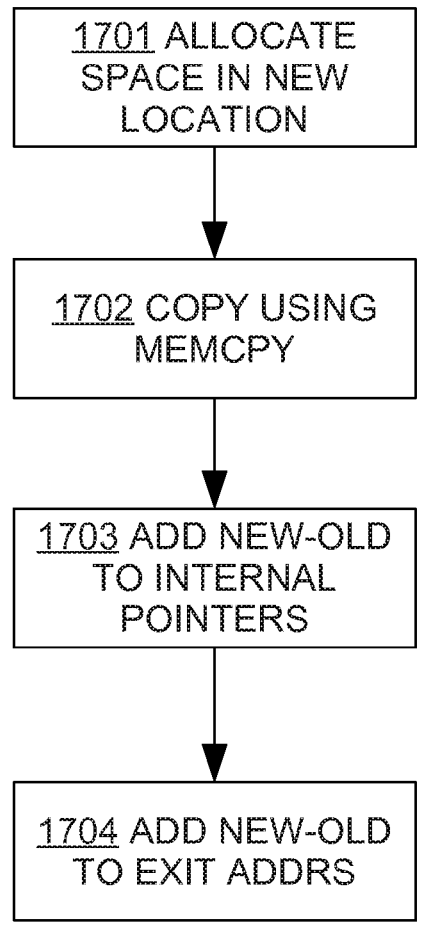

FIG. 17 illustrates ultra-fast copying of an existing multiobject using memcpy and updating its internal pointers and exits.

Figure 18:
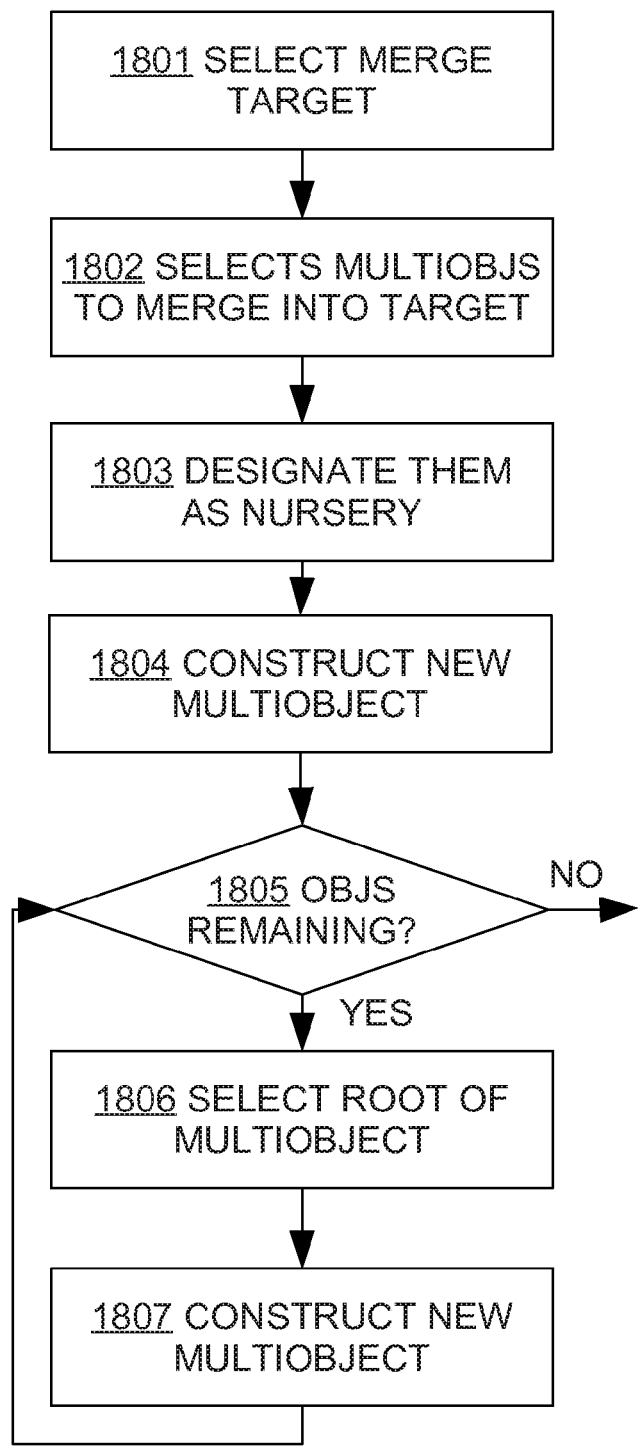

FIG. 18 illustrates merging several existing multiobjects into one or several new multiobjects.

Figure 19:
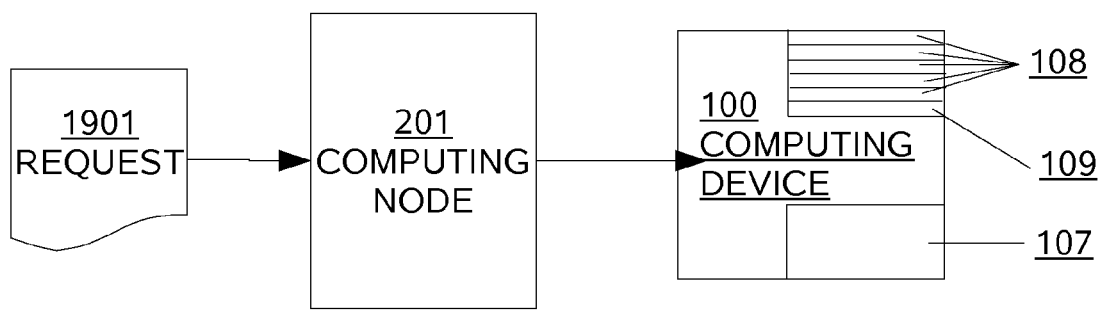

FIG. 19 illustrates a clustered computing system where a frontend operates without some elements of this invention but parts of the service provided to users is implemented by sending a request to a computing device according to this invention.

Figure 20:
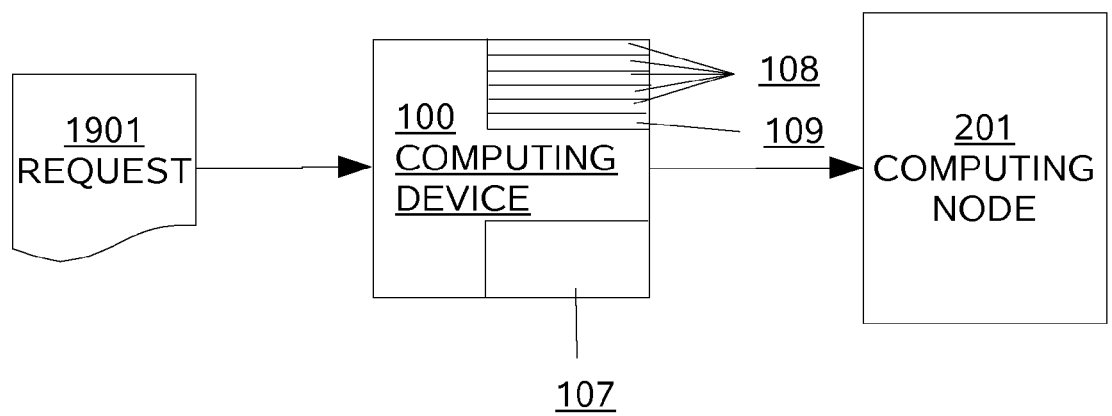

FIG. 20 illustrates a clustered computing system where a frontend computing device (using the elements of this invention) implements certain parts of the service provided to users by sending requests to simpler computing nodes that do not themselves employ all elements of this invention.

Figure 21:
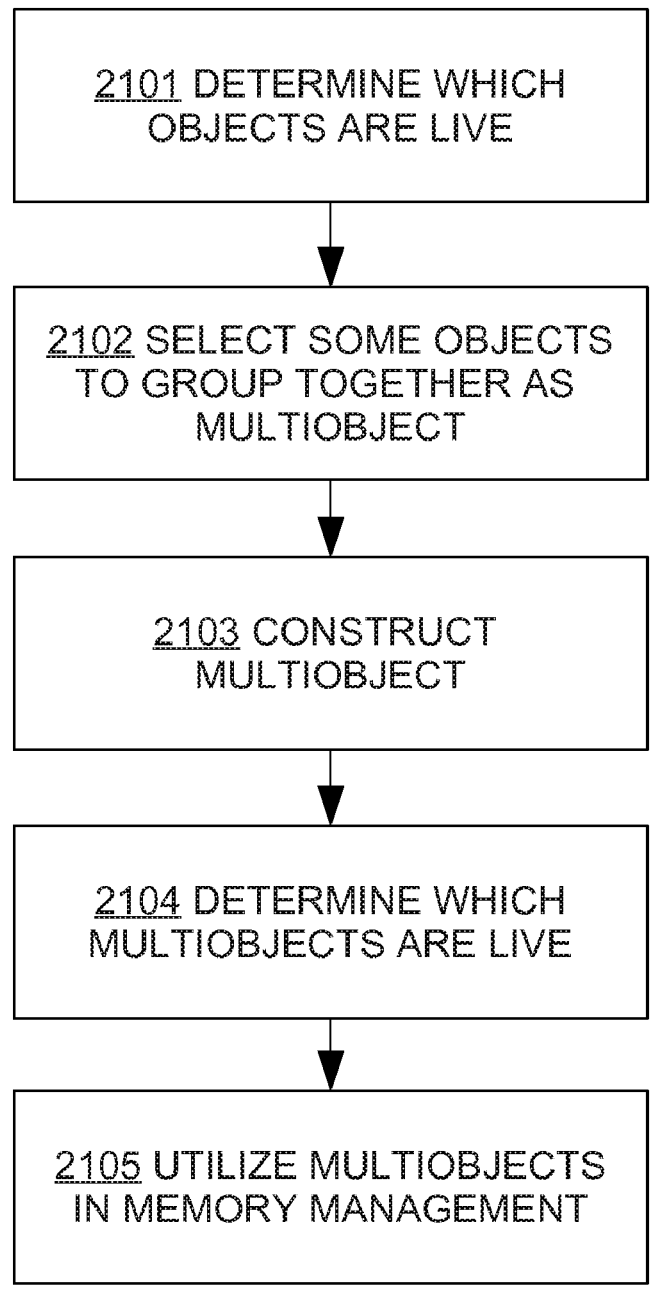

FIG. 21 illustrates the basic elements of a garbage collection method according to the present invention.

Figure 22:
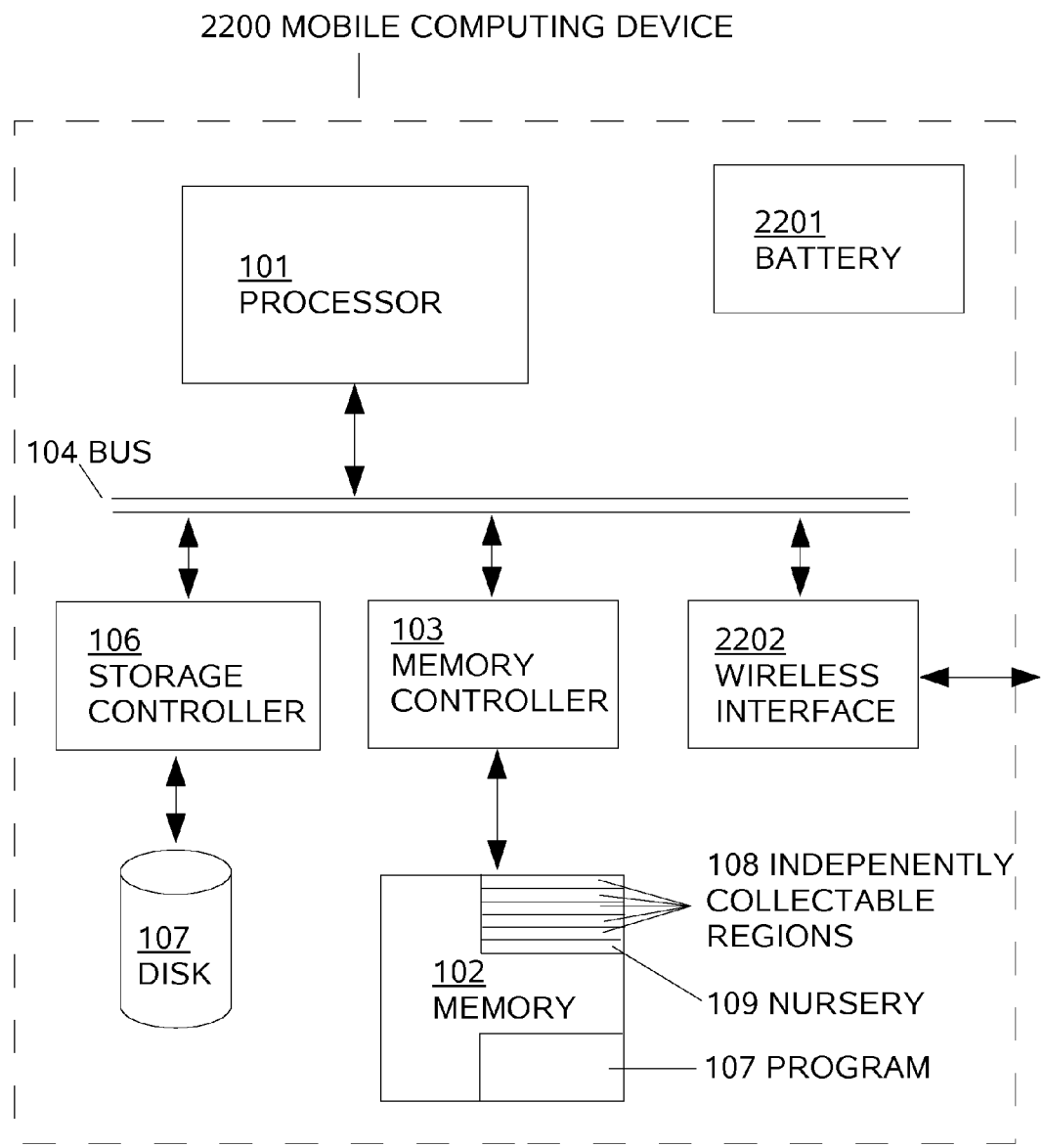

FIG. 22 illustrates a mobile computing device according to the preferred embodiment.

Figure 23:
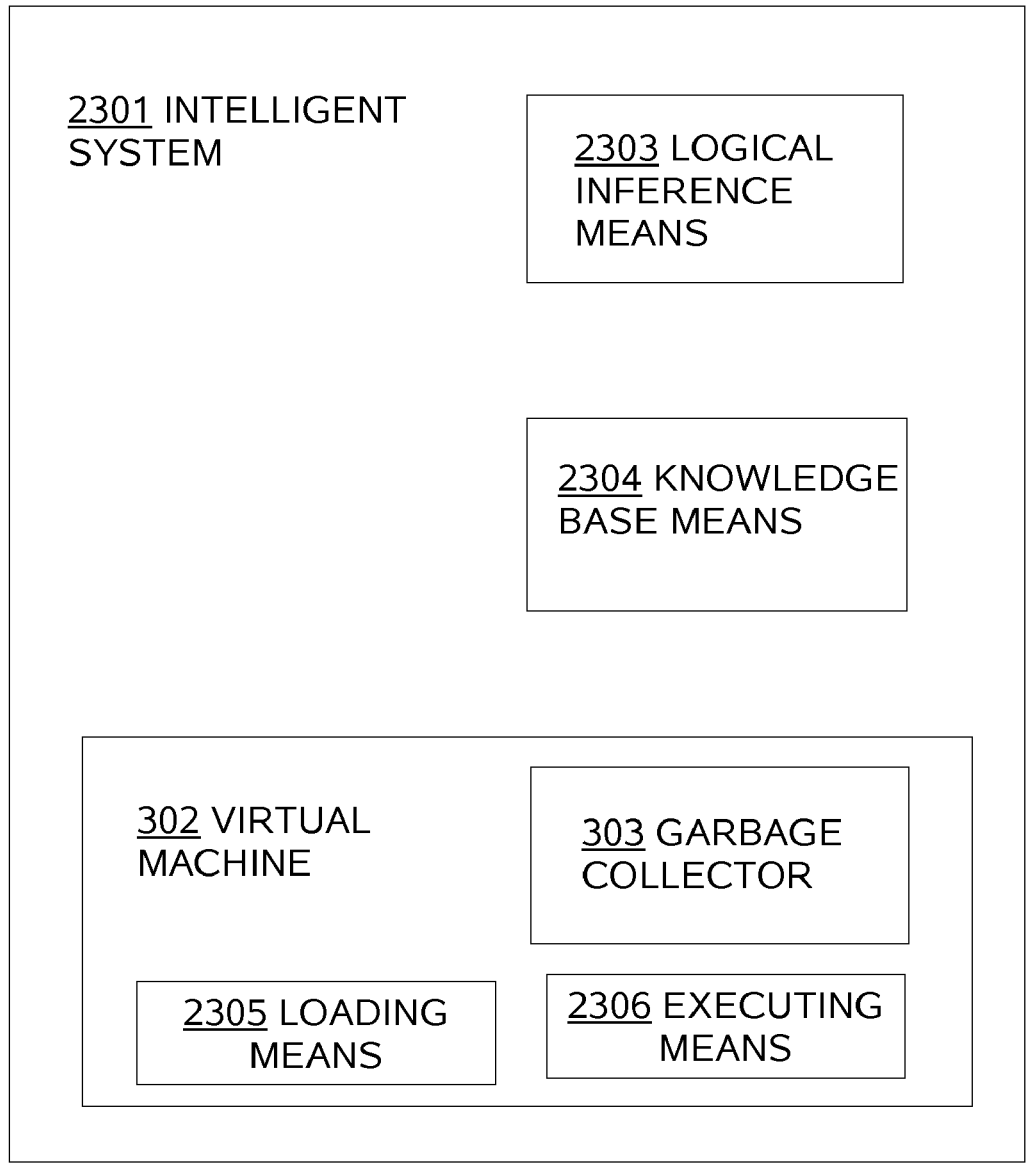

FIG. 23 illustrates an intelligent system according to the preferred embodiment.

FIG. 24 illustrates a computer-readable software distribution medium according to the preferred embodiment.

DETAILED DESCRIPTION OF THE INVENTION

A multiobject is defined as a tree of objects having independent identity as a whole. The tree has a single root object (note that the term "root" is used with two meanings in this disclosure—the conventional meaning in data structure literature of the root of a tree, and the conventional meaning of an intrinsically live reference (global variable, stack frame, etc) in the garbage collection literature; however, no confusion should arise as to which meaning each use refers to). Only the root object can be referenced from outside from outside the multiobject. Other objects in the multiobject all have exactly one reference, which is from within the multiobject. Each object in the multiobject can contain references to other multiobjects (i.e., to their root object); thus, a multiobject can reference many other multiobjects.

Clearly, if the root object of a multiobject as described becomes garbage (is no longer referenced from any live objects), then the entire multiobject is garbage.

The preferred memory layout (800) of a multiobject is illustrated in FIG. 8. The root object (801) begins the memory area of the multiobject, followed by zero or more additional objects (802), with possibly some padding (804) in between to achieve proper alignment for the objects. Finally, certain metadata can follow the multiobject (803). It is also possible to use layouts where there are gaps in some multiobjects, or where a multiobject might be embedded in another object. Preferably, however, the objects in a multiobject are stored in consecutive memory locations (except for minimal padding for alignment, which is included in the total size of the multiobject). For simplicity, the tree structure of the objects is not shown in FIG. 8, but (801) is the root of the tree, and the others follow in some specific order, such as left-to-right depth first order. Left-to-right and right-to-left refer to the order in which pointers contained within a single object are scanned. Other orders, such as right-to-left depth first order could also be used. A left-to-right or right-to-left breath first order is also possible. (Having a specific order will help in implementing on-the-fly updating of the multiobject reachability graph, the details of which are beyond the scope of the present disclosure.)

Preferably, the root object (801) of the multiobject is the first object in the memory representation of the multiobject. In systems with tagged objects, the starting address of the multiobject would thus typically be computed by stripping the tag bits from the cell pointing to the root object. Other objects (802) of the multiobject follow the root object, in the selected order. Note, however, that the selection of the boundaries of the multiobject is rather arbitrary, and it is completely permissible to select the boundaries e.g. by taking objects up to the maximum size in breath-first order or in hierarchical copy order. The specific order refers to the order in which the selected objects are ordered within the multiobject; thus, even if hierarchical decomposition was used to define the boundaries of the multiobject, the objects internally could be in left-to-right depth first order. It is preferable to select the boundaries of multiobjects in such a way as to minimize the number of exit objects that need to be created for the multiobject (i.e., to minimize the number of pointers pointing out from the multiobject to non-popular objects).

It is preferable to limit the size of multiobjects to a suitable value, such as 32 or 64 kilobytes. Such sizes usually allow gaining most of the benefits in locality, are large enough to keep concurrency control overhead in multithreaded operations small, and are small enough to make memory allocation for them convenient, to keep the maximum stack depths reasonable when traversing them, and to allow relatively tight real-time constraints to be met without needing to split operations on individual multiobjects.

Each multiobject is preferably identified by its metadata (the entry (900), or rather, a pointer or index referring to the entry). Alternatively, a separate identifier could be allocated for the multiobject. If its root object has an identity that remains constant while it is moved, then that identity could also serve as the identity of the multiobject. The identity should facilitate fast access to the multiobject.

It should be understood that even though a multiobject is constructed from individual objects and stored in a contiguous memory area, mutators can manipulate the individual objects without knowing anything about multiobjects. Multiobjects are a garbage collection concept, have their own metadata and special descriptor data structures (such as the entry and exit data structures described below). However, they are completely transparent to mutators and even to the write barrier (whether it is based on card marking, hashtable, or some other method). Only when the write barrier buffer is processed (cards scanned, hashtable traversed, and/or saved old values of written addresses analyzed), typically at the start of an evacuation pause, need multiobjects and remembered set implementation details be considered. In the preferred embodiment, mutators know nothing about multiobjects. Remembered set management and the garbage collector, however, utilize multiobjects as special entities extensively and allocate special metadata for each multiobject, as described below.

In some embodiments multiobjects with more liberal structure may be used. For example, writes to within the multiobject may render parts of the multiobject unreachable, and added external references to objects within the multiobject may make it desirable to have nested multiobjects or entries pointing to within multiobjects.

Maintenance of Remembered Sets

In the preferred embodiment, the total size of the multiobject (902) and the address of its root object (901) are is stored in the entry data structure (900) (also called entry object herein) kept about the multiobject (see FIG. 9). The entry may also contain data related to a tree of exits (e.g., left (904) and right (905) pointers and other data as required by a known binary search tree or other suitable data structure implementation), a reference count for the multiobject (909), one or more timestamps (if timestamps are needed e.g. for implementing generations), number of exits (906) and root pointer (907) for an exit tree (or other link to an exit data structure), a mark value (903) used by multiobject-level global transitive closure computation (or multiobject-level tracing), a list of exit objects referencing the entry (represented by the head pointer (908) of a doubly linked list).

There is a one-to-one correspondence between entries (900) and multiobjects (800) for them (i.e., each multiobject has exactly one entry object). However, entry objects may also exist for individual objects in the nursery (if such objects are referenced from roots, older generations in a generational system, or from multiobjects), as well as for large objects that may be handled specially without the use of multiobjects. In the preferred embodiment, each independently collectable memory region (108) has an index data structure (1102) (such as tree, hashtable, skip list) on which the entries for multiobjects stored in that region are indexed by their key (901).

In the preferred embodiment, an exit data structure (1000) contains the address of the memory location with the exiting pointer (1001), pointer (or index) to the entry for for the multiobject that the exit points to (1006), left (1002) and right (1003) pointers for a binary search tree (though other known data structures could also be used), next (1004) and previous (1005) pointers for a doubly linked list of exits referencing the entry that the exits to (see FIG. 10).

The objects of a multiobject are preferably followed (or preceded) by metadata (803), preferably a bitmap, which specifies which cells of the multiobject contain pointers internal to the multiobject. These pointers must be adjusted when the multiobject is moved (by simply adding the number of bytes or words by which the starting address of the multiobject moves to each such pointer). This metadata is preferably initialized when the multiobject is first constructed, and may be updated if the structure of the multiobject later changes (e.g. because of merging or splitting multiobjects or because a write removes a subtree from a multiobject). Additional bitmaps and other metadata (possibly including the entry and/or exit objects) may be stored after (or before) the multiobject as required for bookkeeping by the system. It would also be equally possible to store the metadata elsewhere, such as in the entry object, in dynamically allocated storage referenced from the entry object, or in a separate data structure. Instead of a bitmap, a hashtable, array of indices, a linked list of indices, a tree, or any known representation for a set could be used.

Remembered sets are maintained to track information about multiobjects and references between them. Remembered sets are implemented by the entry and exit data structures. Preferably, these data structures reside in a fixed address in memory, and are referenced using either pointers or indices to an array containing them.

In this disclosure, when we use the term "pointer" (or sometimes when we use the term "reference" or "refer"), we do not intend to restrict the pointer to always mean an actual memory address. The pointer could also contain tag bits to indicate the type of the pointed object (as is well known in the art), or it could be divided into several fields, some of which could e.g. include security-related or capability information (as in Bishop) or a node or area number plus object index. It is also possible to have several types of pointers, some direct memory addresses (possibly tagged), some going through an indirection data structure (such as an indirection vector, indirection hashtable, or the remembered set data structure (as with inter-area links in Bishop). A pointer might also refer to a surrogate or stub/scion in distributed systems, or might be the identifier of a persistent object in persistent object stores (generally, aspects of the present invention is also applicable to such systems, and may provide even more benefits in such systems than in a single computer using just main memory).

In the preferred embodiment (FIG. 11), each memory region (108) has an associated search tree (1102) that contains entries for all multiobjects in that memory region ordered by the address of their root object (901) (possibly including tag bits). Thus, given an address, one can locate the multiobject that starts at that address or that contains the given address. It is also possible to efficiently enumerate the multiobjects in any given address range. The search tree (index data structure) can be any known binary search tree, such as a red-black tree, a randomized binary search tree, an AVL tree, or an n-way search trees such as 2-3-4 trees of B-trees, a k-d tree, or skip lists, or any other known or future index data structure. In the preferred implementation, the tree is a randomized binary search tree well known in the data structure literature.

In the preferred embodiment, each entry (900) further contains an index data structure (1104) of exits from the corresponding multiobject. This tree uses the address (1001) of the memory location containing the pointer to outside the multiobject as the key. In the preferred embodiment, a randomized binary search tree is used, but any other search structure preferably supporting range queries could equivalently be used.

A garbage collection method according to the present invention contains a step of constructing multiobjects from objects in the young generation (or possibly, from objects already in the old generation and possibly from objects already belonging to other multiobjects, such as in the case of merging or splitting multiobjects, or restoring multiobjects from which sections have been made unreachable by writes to be consecutive). For simplicity, in this description we call the memory area(s) containing the objects from which multiobjects are constructed the nursery, even if some of the objects in a particular construction step might actually be coming from existing multiobjects traditionally considered part of the old generation.

It is furthermore assumed that no information about the distribution of objects in the nursery is previously available; it is not known where individual objects start or end, or which of them are live. However, it is conceivable that such information could be available from some previous step in the garbage collector or mutator, or from global tracing, or in the case that the objects from which a new multiobject is being constructed come from existing multiobjects, and if available such information could be utilized in this step (e.g. to eliminate the use of atomic instructions needed to cope with cycles during multithreaded construction, if it is known that the objects do not contain cycles).

It is assumed that entry points to the nursery are known. Such entry points include roots (typically e.g. global variables, stack locations, and registers), as well as objects pointed to by previously constructed multiobjects (or objects in older generations if multiple object-level generations are used before the multiobject construction step). It is assumed that a write barrier is used for tracking writes to such old (multi)objects, and that before starting to construct multiobjects from the nursery entries (900) are created for all objects in the nursery that are referenced via pointers from older (multi)objects or from roots. In the preferred embodiment, there are no object-level generations other than the nursery, and multiobjects are constructed directly from objects in the nursery.

It is desirable not to maintain remembered sets for very frequently referenced objects, called popular objects. Many garbage collection systems treat such objects specially, often never freeing them. In the preferred embodiment, remembered sets are not maintained for references to popular multiobjects, and popular multiobjects can only be freed by performing a trace of the entire heap (e.g., snapshot-at-the-beginning tracing); however, most practical applications would never need to do this, and if done, it could be done very infrequently.

Objects in the young object area have not been combined into multiobjects, and no remembered sets are maintained for references to older objects (multiobjects) from objects in the young object area in the preferred embodiment. References to objects in the nursery from older objects (multiobjects) are, however, tracked.

There is also a possible variation where the remembered sets are not always kept up to date. According to this variation, full up to date remembered sets are created for a region when objects are copied to it, but after multiobjects have been written into, it is no longer known exactly which multiobjects are referenced from the multiobject that was written into. Such uncertainty goes two ways: first, it may not be known which exits are no longer reachable as a subtree may have been removed from a multiobject by the write, and second, new references to other multiobjects may have been added to the multiobject. Since writes are usually restricted to relatively few memory locations, it would be possible to mark multiobjects (or regions) has having their remembered sets out of date, and e.g. to add new referenced multiobjects on a special list (or equivalently any known set data structure) attached to the entry of the written multiobject, and considering the multiobjects on this list as being referenced by the written multiobject during the transitive closure computation. This would cause some extra multiobjects to be reached during the transitive closure computation below, but the references could again be brought up to date by copying the multiobjects in the region where writes have occurred (or at least the multiobjects that have been written into).

Construction of Multiobjects

The construction of multiobjects is preferably performed in conjunction with a garbage collection step that identifies live objects in the nursery. Since the nursery usually contains individual objects that have not yet been combined into multiobjects, any known garbage collection method can be used for determining which objects in the nursery are live. Well known methods in the literature include mark-and-sweep, copying collection, and refence counting (all on the object level).

In the preferred embodiment, the construction of multiobjects consists of four potentially overlapping phases (some multiobjects can already be in the updating phase while others are still in the identification phase):

identifying roots of multiobjects
determining the size of each multiobject
allocating space for each multiobject
copying objects belonging to each multiobject to the space allocated for the multiobject in a suitable order
updating references to any of the multiobject root objects to be references to the multiobject itself in its new location.

Since the first phase is identifying the roots of multiobjects, and as described below, this step involves tracing the object graph in the nursery, determining which objects are live can advantageously performed simultaneously with this phase, thereby eliminating separate tracing (or other garbage collection method) for liveness detection.

Identifying the roots of multiobjects basically means dividing the object graph in the nursery to tree-like subgraphs, each of which will become a multiobject. In other words, this phase establishes the boundaries between multiobjects.

In the preferred embodiment, only the root of a multiobject can be referenced from outside the multiobject. Thus, every object that is referenced from outside the nursery must be a the root of a multiobject. Likewise, every object that is referenced from more than one other object must be the root of a multiobject. These constraints alone partition the object graph into tree-like subgraphs, and thus would be sufficient for dividing the graph.

However, it is preferable to add additional multiobject boundaries to split very large multiobjects to a more manageable size. If a maximum size is set for multiobjects, then such splitting becomes mandatory. The locations of the splits can be selected using any convenient method. It is, however, preferable that the method produces as few references between multiobjects as possible in order to minimize the size of remembered sets. It is thus advantageous to split the tree preferably in a place where the boundary only crosses one link. However, practical implementation considerations may result in an algorithm that splits the tree in such a way that the boundary crosses multiple links; in this case, each node pointed to by such a crossed link becomes the root of a new multiobject.

Determining the mandatory boundaries and adding voluntary boundaries may be implemented either as a single step or as separate steps. Furthermore, adding boundaries for objects referenced from outside the nursery and adding boundaries for objects referenced from multiple other objects can be done in either the same step or separate steps.

The identification phase is advantageously implemented by a concurrent tracing algorithm. Many implementations of such tracing algorithms are well known in the literature, as well as methods for eliminating recursion from such tracing algorithms. The action performed on each object, however, differs from known tracing algorithms.

In practice the action performed for each object would use atomic instructions, such as a compare-and-swap and/or locked bit-test-and-set instructions in its implementation. For clarity, we describe the actions performed without reference to such instructions; a person skilled in the art should be able to understand which operations must be done atomically. (Such atomic instructions are not required in single-threaded implementations.)

The following pseudocode snippet (syntax roughly based on the C programming language) illustrates the actions performed for each object during tracing. Here, 'cell' refers to a heap cell encountered while tracing an object; 'nursery_start' refers to the beginning of the nursery memory area (extension to the case where the nursery is not contiguous is straightforward but requires e.g. keeping an array of 'visited' and 'multiobj_start_bitmap' arrays, one for each contiguous area); 'log2_of_object_alignment' is base 2 logarithm of the address multiple on which all objects must start (which is typically 8 or 16, resulting in values of 3 or 4 for this variable; the '>>' operator in C means right shift); the 'visited' array contains one slot for each possible object starting location in the nursery, is initialized to all INVALID values before this call and each slot actually starting an object is set to the identifier of the multiobject that it belongs to; 'multiobj_start_bitmap' contains one bit for each possible object start location, and a bit is set to one for all those locations that actually start a new multiobject. The 'allocate_entry' function allocates a new multiobject metadata data structure, preferably the entry data structure (900) described above.

```
handle_heap_cell(cell, current_multiobj_id) {
    idx = (cell - nursery_start) >>
        log2_of_object_alignment;
    if (visited[idx] == INVALID)
    {
        visited[idx] = current_multiobj_id;
        return RECURSE_TO_CELL;
    }
    if (multiobj_start_bitmap[idx] == 1)
        return DO_NOT_RECURSE_TO_CELL;
    multiobj_start_bitmap[idx] = 1;
    new_multiobj_id = allocate_entry(cell);
    visited[idx] = new_multiobj_id;
    return DO_NOT_RECURSE_TO_CELL
}
```

Not shown in this pseudocode for simplicity is that preferably before starting any tracing, all externally referenced objects are allocated their own multiobject metadata, and the corresponding slots in 'visited' and 'new_multiobj_id' are set, and for any traversal, first time 'handle_heap_cell' is called, if visited[idx] equals current_multiobj_id, then RECURSE_TO_CELL is returned. This is conveniently arranged by having a global (or thread-local, or e.g. a field in a context structure) variable indicate whether the call is an initial call (the other global variables above can be located similarly).

The size of most multiobjects can be computed on the fly during the tracing method described above. However, in the case where the tracing later encounters a cell in the middle of another multiobject, the size of that latter multiobject must be recomputed, preferably after all multiobject boundaries have been discovered.

To limit the size of multiobjects, the tracing method can at any time turn a previously unvisited object into a multiobject root and schedule separate tracing for that multiobject (though equivalently that tracing could also be merged into or called from the tracing discussed here), thereby splitting the multiobject. During traversal it can maintain the size of the multiobject so far, and if the size grows beyond a certain limit, split the multiobject this way.

It is preferable to use two bounds, a soft limit (minimum desirable size) and a hard limit (maximum size). Between these limits, it is preferable to use appropriate heuristics to minimize the number of times the multiobject boundary crosses links. One such method is to compute the limit based on the number of links where we have already inserted a boundary, the depth of the tracing algorithm's stack, and possibly other data. Preferably, the limit would be 'min(a*stack_depth+b*cuts_inserted+soft_limit, hard_limit)', where 'a' and 'b' are constants, 'stack_depth' is the depth of the tracing algorithm's stack, and 'cuts_inserted' is the number of times we have already voluntarily turned a cell into a new multiobject root while traversing the current multiobject.

The following code snippet illustrates the handling of objects during tracing when size computation and limiting is included. Here, 'entries[ ]' array represents a way of accessing the metadata for a multiobject by its identifier; it could be array, tree, hashtable, skip list or other suitable data structure. The 'size' variable represents the size of the current object; we could also write 'entries[current_multiobj_id].size' in its place (in practice it would likely be stored e.g. as thread-local data or in a context structure). In practice separate metadata would be used during traversal to avoid increasing the size of the entry (900) by additional fields (thus some of the additional fields are not shown in FIG. 9). The 'schedule_traversal' function queues the new multiobject root to be scanned (before continuing the current trace, concurrently with the current tracing, or at a suitable later time).

```
handle_heap_cell(cell, current_multiobj_id,
                 stack_depth) {
    idx = (cell - nursery_start) >>
        log2_of_object_alignment;
    new_size = size + size_of(cell);
    limit = min(a * stack_depth + b * cuts_inserted +
                soft_limit, hard_limit);
    if (visited[idx] == INVALID && new_size < limit)
    {
        visited[idx] = current_multiobj_id;
        size = new_size;
        return RECURSE_TO_CELL;
    }
    if (multiobj_start_bitmap[idx] == 1)
        return DO_NOT_RECURSE_TO_CELL;
    multiobj_start_bitmap[idx] = 1;
    new_multiobj_id = allocate_entry(cell);
    if (visited[idx] != INVALID)
        entries[visited[idx]].needs_size_computation = TRUE;
    else {
        visited[idx] = new_multiobj_id;
        schedule_traversal(new_multiobj_id);
    }
    return DO_NOT_RECURSE_TO_CELL
}
```

It will be useful in implementing this using atomic instructions to first set 'visited[idx]' to 'current_multiobj_id', and then set it to 'new_multiobj_id' if needed (no atomic instruction is needed for this latter set).

Determining the size of a multiobject is preferably performed as described above. For those objects for which separate size computation is needed ('needs_size_computation' was set), the tracing algorithm could use the following code snippet (here we also illustrate the handling of the initial object):

```
handle_heap_cell(cell) {
    if (initial) {
        initial = FALSE;
        size = size_of(cell);
        return RECURSE_TO_CELL;
    }
    idx = (cell - nursery_start) >>
        log2_of_object_alignment;
    if (multiobj_start_bitmap[idx])
        return DO_NOT_RECURSE_TO_CELL;
    size += size_of(cell);
    return RECURSE_TO_CELL:
}
```

Note that if this is performed after identifying all multiobject roots, there will be no modifications to 'multiobj_start_bitmap', and this can run without any atomic instructions or synchronization.

It should be noted that these pseudocode snippets include the determination of which objects are live (live and only live objects will be visited), integrated into the identification of the roots of multiobjects as well determining the size of (most) multiobjects.

Allocating space for each multiobject can be performed either for many multiobjects in parallel before copying starts, or for each multiobject separately, e.g. just before it is copied. The space may be allocated using GCLABs (thread-local allocation buffers for GC threads), or preferably from a new region being used for allocation and not yet subject to garbage collection; in the latter case, the allocation can use a lock or e.g. a compare-and-swap instruction (since there are many fewer multiobjects than ordinary objects, concurrency control for allocation is not likely to become a performance bottleneck).

Copying objects belonging to each multiobject to the space allocated for the multiobject can be performed entirely without locking, assuming the preferred case that a single multiobject is copied by a single thread. In essence, the space allocated for the multiobject serves like a GCLAB, allowing the thread to hand out space for each object without locking, but in this case also without checking whether there is space remaining in the GCLAB.

During copying, objects are preferably traversed (and copied to the allocated space) in a specific order, with the root object copied first. Preferably, left-to-right depth-first traversal is used. It is also preferable to arrange list nodes so that their 'next' pointer is the first field of the node, and the current value the second field, so that lists nodes get organized at consecutive memory addresses to improve memory locality during list traversals. (One could equally use right-to-left depth first traversal and reverse the fields of list nodes. It is important that the copying order be selected such that good locality is achieved in the overall system.)

It is also possible to use different orders for different classes of objects. For example, the definition of an object class could indicate that it is preferable to use a left-to-right order, a right-to-left, or a hierarchical decomposition order for objects of that class (the last order potentially being particularly relevant for objects used for implementing trees). The method used could be selected by the compiler, based on heuristic inspection of the class definition, or based on a hint or directive provided by the programmer. During copying, the order of copying could be selected based on the class of the object. It might be preferable to restrict each multiobject to contain objects in only a single specific order, or alternatively multiobjects could be allowed to contain objects in a variety of orders.

Besides affecting memory locality, the order used is significant in handling writes to cells within multiobjects, as it affects which objects in the multiobject become unreachable as the result of such a write.

If all multiobject roots in the nursery are identified before copying begins, then there is no need to use atomic instructions during copying. Only the 'multiobj_start_bitmap' bitmap is used in this phase. Actions performed during the copying traversal are illustrated by the code snippet below (here, it is assumed that 'my_alloc_ptr' has been initialized to the start of the memory allocated for the multiobject before tracing, and 'cellp' is a pointer to the previously copied memory area to the location containing 'cell'; the 'UNTAG' and 'TAG_OF' functions manipulate tag bits in cells, and would not be used in a system that does not utilize tag bits):

```
copy_heap_cell(cell, cellp) {
    idx = (cell - nursery_start) >>
        log2_of_object_alignment;
    if (initial)
        initial = FALSE;
    else if (multiobj_start_bitmap[idx] == 1)
        return DO_NOT_RECURSE_TO_CELL;
    size = size_of(cell);
    p = my_alloc_ptr;
    my_alloc_ptr += size;
    memcpy(p, UNTAG(cell), size * CELL_SIZE);
    *cellp = ADD_TAG(p, TAG_OF(cell));
}
```

Also during the copying, it is determined which cells of the new (copied) object point out from the object. This includes cells that point completely out of the nursery, as well as cells that point to nursery addresses having the corresponding bit set in 'multiobj_start_bitmap'. An exit (1000) is created for each such cell encountered (using the new address 'cellp' as the address of the exit), and added to the data structures under the entry object (preferably, the exit addresses are first collected into an array during traversal, and as they will be increasing order of the addresses (in a left-to-right trace), any known linear-time balanced binary tree construction algorithm can be used to construct an exit tree for the entry after it has been copied). Note that the size of the array is strictly limited by the maximum multiobject size in the preferred implementation. It is preferable to not create exits (1000) for pointers to popular objects.

If some object sizes are not multiples of the minimum object alignment, padding bytes may need to be added between objects. This is not shown in the code snippets above, as implementing it is trivial (e.g. by rounding up the sizes in 'size_of' or by adjusting 'size' or the allocation address up to the next proper multiple before using it).

To update references to the objects that have become part of newly constructed multiobjects (and, in the preferred implementation, were thus moved), the simplest way is to track which exits refer to each entry by putting the exits on a doubly linked list (908) whose head is in the entry, as already described above (alternatively, any other set data structure supporting reasonably efficient insertion and deletion could be used, such as hash table, tree, list, skip list, or array). Then, code similar to the pseudocode below is used (here, 'entry_meta' refers to the additional metadata that is not normally kept in the entry data structure, such as 'new_key', the new address of the multiobject (possibly with tag bits added).

```
update_references(entry, entry_meta) {
    entry.key = entry_meta.new_key;
    for (ex in entry.refexits) {
        *ex.addr = entry_meta.new_key;
    }
}
```

If entry data structures are stored on a per-region basis (as in the preferred embodiment), then the entry data structure may be moved to the new region now containing the multiobject.

In the typical case where nursery refers to the young object area and all live nursery objects have been copied to multiobjects, the young object area now only contains dead objects, and can be reclaimed. Thus, the method of constructing objects is a way of determining which objects in the nursery are live. (There are other possible embodiments where multiobjects are constructed of only some of the objects in the nursery; in such systems, some of the remaining objects might still be live after multiobject construction.)

A variation of the method of constructing multiobjects is possible, where the size of a multiobject does not need to be known beforehand (and even identifying the roots of the multiobjects can be done as previous multiobjects are being constructed, at least with regards to voluntary roots). In this variation, space is allocated for one object at a time, preferably from a thread-local GCLAB to ensure that the space gets allocated consecutively. If the allocator no longer has contiguous space available, the current multiobject is complete, and additional multiobjects will be created to hold any additional objects reachable from the current multiobject (the objects immediately reachable from the current multiobject becoming their roots). In such a system, the size of a multiobject need not necessarily be known until it is complete, and copying the multiobject can start even before it is known which objects are going to form the multiobject (though the root object must still be known before copying can start). It would also be possible to trace multiobjects that have been written into to bring their exits up to date or to list them accurately.

Copying Existing Multiobjects

The copying of existing multiobjects (old generation data) consists of the following partially overlapping phases in the preferred embodiment:
  selecting which multiobjects to copy
  allocating space for each multiobject to copy from a new location
  copying the selected multiobjects to the allocated space, and fixing up any internal pointers in the multiobjects
  updating any pointers referring to the copied multiobjects to refer to their new locations
  updating the starting addresses of the multiobjects in their entries and moving the entries to their new regions as appropriate
  updating the exit addresses associated with each copied entry to point to the new location of the entry.

The present invention gives the garbage collector a lot of freedom in selecting which objects to copy, and thus many different methods are available for selecting which multiobjects to collect. Possible criteria for such selection include but are not limited to:
  exact or estimated amount of free space in a memory region (to make all multiobjects in the region more preferable for collection)
  some other region-related metric, such as utility (cost-benefit) of collecting a region
  number of different writes made into a multiobject
  number of cells written in a multiobject
  number of bytes freed from a multiobject due to writes
  number of nested multiobjects
  reachability from permanent roots (global variables)
  distance from a root (global variables, stack, registers)
  reachability from key objects
  frequency of reference.

In general, the selection may be region-based, individual multiobject based, or a hybrid of the two (e.g. to pull in individual multiobjects in order to improve locality).

When the selection is region-based, 'gc_index', a metric of the desirability of collecting the region, i.e. a priority of collecting it, is preferably computed for each region. This computation can take place in separate metric update steps, such as during global SATB tracing or during a traversal of the multiobject graph using remembered sets, or the metrics may be updated whenever an object is allocated or freed in the region (as in Bishop), or when objects in the region are assigned (also in Bishop).

The 'gc_index' is the priority of scheduling collection for the region; several methods exist in the literature for efficiently selecting the highest priority task(s) from a potentially large set of tasks (including the use of any priority queue data structure, which is the preferred selection method). The metric itself is preferably a function of used bytes in the region, free bytes in the region, number of entries in the region, number of exits in the region, the estimated cost of collecting the region, the estimated benefit from collecting the region, the age of the region, the number of incoming references to the region, the number of outgoing references from the region, frequency of access of the region, frequency of writes to the region, common properties of multiobjects used when selecting this region as their allocation region, etc. The function is preferably a rational function (i.e., a polynomial divided by a polynomial) of the previously mentioned values, their inverses (i.e., 1/x), and their logarithms.

If any of the metrics listed above for computing gc_score, or other suitable metric, indicates that it clearly does not make sense to collect the region, the region can be left out of any priority queue used for selecting regions, or its gc_score can be made to indicate that it is very undesirable to collect the region. If a region is currently being used for allocation, it preferably should not be subjected to collection (either by having giving it a low-desirability gc score, or by not putting it on a priority queue). Alternatively, a check could be made after selecting a region for collection as to whether it is currently being used for allocation, and cease using it for allocation in this case. The selection of which alternative to choose may depend on the fraction of already allocated data in the region that has been since it was allocated.

In addition to a well known priority queue (such as a heap, treap, etc), a list, doubly linked list, skip list, tree, sort, or any other known method or ordering data items based on a value can be used for ordering the items (regions), and any known method may be used for dynamically updating the position of the items as their key (gc_index) in the data structure changes. For an introduction to this very mature field, see e.g. Knuth: The Art of Computer Programming, Vol. 3: Sorting and Searching, pp. 150-159, Addison-Wesley, 1973.

Another possibility is to quantize 'gc_index' into a plurality discrete values (such as values 0-10 or 0-100 to represent an index in the range 0.0-1.0 by multiplying the value by 10 or 100 and rounding to the nearest integer, or by using any suitable known adaptive quantization method for the task), use the quantized value to index an array (or as a key into a hashtable), and store a list of regions with the same quantized 'gc_index' as the array slot or hashtable value, and to select a number of regions, iterate over the indices of the array (or keys of the hashtable), and take regions from the lowest (or highest) numbered slots where the list is non-empty.

One way of estimating the available free space in a region is to calculate its used space during the transitive closure computation; the rest of the region is free. When a multiobject is freed, the space used by it can be added to the free space amount in its containing region, and the region's 'gc_index' (and any data structures where the region might be stored based on its 'gc_index') updated. Another way is to update the free space counts on the fly, whenever a multiobject is allocated from the region, freed in the region, or moved out from the region (e.g. because it was pulled in to the collection of another region in order to improve locality or to merge it with another multiobject). This may imply recomputing 'gc_index' and updating any data structures where the region is stored more frequently. The latter method is preferred, though either probably works well.

Allocating space for the multiobject to copy can be done identically to the case of constructing a new multiobject; any known method for selecting the region (or generation) where to allocate it can be used.

Copying the selected multiobjects to a new location may be done using any of several alternatives. In the simplest case, there have been no writes to the multiobject since it was constructed or last copied, and thus no objects have been made inaccessible in the multiobject. In this case, a simple copy followed by updating internal pointers is sufficient to copy the entire multiobject. This is illustrated by the code below ('src' is the old address of the object, 'dst' the new address, 'size' its size in cells (words), and pointer arithmetic is assumed to operate as in C):

```
simple_copy(dst, src, size, bitmap) {
    memcpy(dst, src, size * CELLS_SIZE);
    for (i in bitmap where bitmap[i] == 1)
        dst[i] += (char *)dst - (char *)src;
}
```

If exits are stored in a binary tree (1104) associated with the entry for the multiobject, as in the preferred embodiment, the addresses (1001) of any exits can be updated without reconstructing the tree by adding 'dst-src' to the address of each exit (alternatively, exits could use offsets into the containing multiobject as their keys, in which case their addresses would not need any updating; however, simplicity in other parts of the system makes using actual addresses preferable).

The ability to copy objects using memcpy requires that we know which locations in the multiobject contain internal pointers. In the preferred embodiment this is done by adding a bitmap after the multiobject, with a bit for each possible pointer location within the multiobject, and having the bit indicate whether the corresponding pointer contains an internal pointer (i.e., a pointer that points to another object within the same multiobject).

This copying method also scales much better than existing methods to modern shared memory multiprocessor computers. The known methods use atomic instructions to update forwarding pointers. For example, in Detlefs et al (2004) p. 39 "Threads allocate an object copy in their GCLAB and compete to install a forwarding pointer in the old image. The winner is responsible for copying the object and scanning its contents. A technique based on work-stealing [1] provides load balancing." The present invention makes it possible (but not necessary) to allocate the entire multiobject can be allocated at once, since its exact size can be known beforehand, significantly (by a factor of 10 . . . 1000 or so) reducing the number of allocations, allowing more effort to be spent on selecting where each multiobject should beneficially be allocated, and potentially even lowering lock contention to the level where GCLABs (thread-local allocating buffers for garbage collection threads) are entirely unnecessary. The "compete to install a forwarding pointer" in the referred known method would typically involve the use of an atomic compare-and-swap instruction, which acts as a memory barrier (see e.g. AMD64 Architecture Programmer's Manual, Vol. 2: System Programming, Advanced Micro Devices, Inc., September 2003 (publication number 24593, rev. 3.09), sections 7.1-7.2; the terms read barrier and write barrier have different meanings from the garbage collection literature in processor architecture literature—this instance refers to the processor architecture meaning) and is many (10-100) times more expensive than a normal prefetched and cached memory access. With the present invention, it is possible (but not necessary) to avoid using atomic instructions for copying a multiobject (except possibly some locking or atomic instruction for the initial space allocation). In practice it allows most old space multiobjects to be copied at almost full memory bandwidth (i.e., close to memcpy( ) speed).

Many elaborate methods have been disclosed and patented in the prior art for managing the work queues during garbage collection and for stealing work from other threads. Such methods are important in a known tracing based collector. But since multiobjects are preferably strictly limited in size, and this limit is only a very small fraction of the amount typically copied during an evacuation pause, there is no need for sophisticated load balancing or work stealing algorithms. It is sufficient to simply put all multiobjects to be copied on a list or array, and have each garbage collection thread just take the next multiobject from the list when they are done with the previous one. Since the work in copying a multiobject is large in comparison with the overhead of a lock, simple locking is adequate for protecting the work list; techniques for managing such work lists have been known for decades.

A more complex (and much less frequent) case of copying occurs when there has been a write to the middle of the object (to a cell that used to contain an internal pointer), thus rendering a part of the tree inaccessible. One way to copy such multiobjects is to threat the entire old multiobject as the nursery and to consider the boundaries of the multiobject to be the old boundaries plus any links going out from written cells).

In order to track which cells have been written, it may be desirable to associate a second bitmap (or any other suitable representation of a set), preferably stored at the end of the multiobject, immediately after the internal pointer bitmap. The write barrier (or code that processes records from a write barrier buffer) would set the bit corresponding to the written location whenever a write occurs to the multiobject. (Since multiobjects are stored in a binary search tree in the preferred embodiment, the write barrier can easily find the containing multiobject by searching for the multiobject with the largest key less than or equal to the written address.)

In the more complex copying case, updating the addresses (1001) is not as easy, as different exits move by different amounts. They can be updated e.g. by looking up each exit using its old address, saving a pointer or index for the exit in an array together with its new address, and updating all addresses after the copy. Another option is to use a linear-time binary tree construction algorithm to reconstruct the tree (1104).

An old entry can also be moved by completely reconstructing it, i.e., by considering it part of a (possibly discontinuous) nursery from which a new multiobject containing the objects of the old multiobject is constructed. In other words, this reconstructs the multiobject by first determining which objects in it are live (this information may be immediately available from bookkeeping associated with the multiobject, partially including the bitmap indicating which cells have been written), and copying the objects into a new memory area. Space for all the objects to be copied may be allocated before copying starts (if the size of the resulting multiobject is known before copying), or it may be allocated as each object is copied, in which case copying should be terminated if space runs out from the current contiguous area, and the rest of the objects should be copied to another multiobject in another contiguous memory area (creating exits from the first object to the latter objects). The new multiobject preferably reuses the memory of the entry (900), so that pointers to it (mostly from exits) do not need to be updated and thus preserving the identity of the multiobject (if the entry is seen as representative of the identify of a multiobject, whereas its key reflect its current location). It is also possible to preserve the identity of the multiobject by not reusing the space of its entry data structure if an indirection e.g. through an array is used for accessing the entry (900).

Several multiobjects can be merged into a single multiobject by designating one of the multiobjects as the merge target into which the other multiobjects are merged, and constructing a new multiobject with the root object of the merge target as its root object, while designating the old multiobjects to jointly constitute the nursery.

Sometimes it is desirable to merge objects even if their combination does not all fit within the maximum size limit permitted by the system, or if long-enough contiguous space is not available or cannot be easily located. In such cases, it is possible to identify some of the objects contained in the multiobjects being merged as roots of additional multiobjects, and construct multiple multiobjects as a result of the merge.

In the preferred embodiment, the merge target will preserve its identity during the merge; in other words, the multiobject resulting from the merge will reuse the entry (900) of the merge target.

Updating the starting addresses and references to multiobjects is similar to the case for constructing a new multiobject. Generally, the multiobject would be removed from the data structures (1102) of its old containing region using any known removal algorithm suitable for the data structure (such as a binary tree item removal algorithm), then changing its key (i.e., starting address), and adding it to the data structures (1102) of its new region.

While copying of old multiobjects is preferably run a region at a time, it is also possible to copy them one multiobject at a time (or several multiobjects in parallel) without much regard for regions. In such a system, the regions would more likely to correspond to coarse areas, such as the young object area, old object area, and possibly popular object area and large object area. Possibly the old object area could be divided to a number of generations.

Transitive Closure Computation of the Reachability Relation

Live objects in the system are those that are reachable from any root (such as global variable, stack slot, or register) by following pointers through arbitrarily long chains of other live objects. The determination of which objects are reachable is complicated by the (directed) object graph generally being cyclic and having many pointers point to the same node (i.e., contains shared parts). The standard tracing algorithm in most mark-and-sweep (and copying) collectors can be seen as a variation of the standard algorithms for computing a transitive closure on the object level.

In a system according to this invention, liveness is at least sometimes determined on the multiobject level, without reference to individual objects contained in the multiobjects (for at least some multiobjects). Any well known algorithm can be used for computing the transitive closure, including those described in Sedgewick, Robert: Algorithms in C, 3rd. ed., Part 5: Graph Algorithms, pp. 161-172, Addison-Wesley, 2002, but the algorithm is used on the multiobject level rather than the object level.

In a practical system, however, several complications arise. In order to meet real-time requirements in large systems, it is desirable to run the transitive closure in parallel with normal mutator and/or garbage collector operations. At the object level, well-known methods for doing this include snapshot-at-the-beginning tracing and incremental-update tracing, as described e.g. in Matsui et al: Complementary Garbage Collector, IWMM'95, LNCS 986, pp. 163-177, Springer, 1995. However, these methods require special code in the write barrier, which slows down mutator execution when the global tracing is running.

When implemented on the multiobject level, the transitive closure computation only accesses the entry (900) and exit (1000) data structures and exit trees (1104) in the preferred embodiment. It does not need to access the underlying objects at all, and thus no special code is needed in the write barrier. What is even more important, the entry and exit data structures for multiobjects are usually several orders of magnitude smaller than the underlying objects, and thus the total amount of memory read by the transitive closure computation is often reduced by several orders of magnitude. Since modern processors are mostly limited by memory bandwidth, this reduction in memory bandwidth usage is very significant, even if idle processor cores were in principle available to compute the transitive closure. The impact of this saving increases as memory sizes grow, and we expect it to be important in large knowledge-based applications using heaps of many tens or hundreds of gigabytes. In general, processor core speeds are growing faster than memory speeds, so this advantage is likely to grow in importance in the future.

A further detail is that the entry and exit data structures are preferably allocated as arrays of such data structures. Since the transitive closure computation (almost) only accesses these data structures, it can fully utilize its cache and TLB for accessing these structures with maximum performance. In the multiobject construction method above, we saved exit addresses in an array and constructed the tree after the multiobject has been copied; another benefit of this approach is that we will be allocating all exit data structures for the entry at the same time, and can attempt to allocate them from (nearly) consecutive slots in the array(s) of all exit objects, further improving locality in the transitive closure computation as well as in any tree management operations for exit trees. As the performance of many modern algorithms is dominated by memory latencies and particularly TLB misses, such locality issues can easily result in a factor of two or more difference in performance.

Since the transitive closure computation may run across several garbage collection pauses or several nursery evacuations, it is necessary to ensure that multiobjects created since the transitive closure was started are not inadvertently considered unreachable. Also, during mutator execution, writes can occur which change pointers in the object graph. In the preferred implementation, the write barrier tracks which locations have been written since the last evacuation pause, and when processing the write barrier buffer, the garbage collector may create new exits if the location previously did not contain an exit but now needs one, may remove exits if the location previously had one but no longer needs one for the new value, and may modify the 'value_entry' field (1006) of the exit to point to a different entry. Without some special actions, these concurrent modifications could cause some multiobjects that were reachable when the transitive closure computation started to be missed and considered unreachable (e.g. if the only reference to a multiobject was moved from a multiobject not yet visited by the transitive closure to a one already visited).

Our preferred solution is to use a conceptual analog of the snapshot-at-the-beginning method at the multiobject level (though an analog of incremental-update method could probably also be used). However, the implementation is quite different. In the known object-level snapshot-at-the-beginning method, the write barrier adds the old value of the written cell to a buffer that will be scanned by the global object-level tracing. An aspect of this invention is, whenever a reference is removed from the 'value_entry' field of an exit object (either because the exit is being removed, or because its 'value_entry' is being changed to point to a different entry), to push the old 'value_entry' to the stack of the global transitive closure computation (if certain conditions apply, such as that the closure computation is currently running). As an alternative to pushing the old entry pointer on the stack, several could also be gathered in e.g. a thread-local buffer and then added to the transitive closure computation at once, however before the transitive closure computation ends. When we say "push an entry", we actually mean pushing an identifier for the entry, such a pointer to the entry (900), or the index of the entry in an array.

In the preferred implementation, a flag is used to indicate whether a transitive closure computation is currently running. This flag should be set before the transitive closure starts running concurrently with mutators or garbage collector (usually after roots have been pushed). This flag can be cleared after the stack is empty and the closure computation has stopped (but preferably before starting to sweep all entry data structures to see if any were unreachable).

The various transitive closure algorithms are generally variations of either depth first or breath first graph traversal algorithms, with some kind of 'visited' flag stored for each node of the graph. In the case of object-level tracing, the flag is usually a bit stored in a separate area used for such mark bits, though some systems also store it in an object header associated with each object. In the case if multiobject-level transitive closure, a vector of mark flags (bits, integers containing e.g. the sequence number of the transitive closure computation to avoid needing to clear the values before the computation starts; floating point numbers and other data types could be used). In many embodiments of the present invention, it is preferable to store the mark flag (903) (bit or integer) in the entry (900), as the entry will be accessed anyway during the traversal and will thus be brought to the cache anyway, whereas a accessing a separate bit (or integer) vector would be more likely to cause a cache or TLB miss in large systems.

It should be noted that even though we describe the transitive closure algorithm as pushing entries on its stack, it could also be implemented by pushing exits on the stack. The preferred method of pushing entries keeps the stack smaller and is also otherwise more convenient for an efficient implementation. Also, we describe and prefer to implement the transitive closure computation as a single-threaded operation, but it could also be implemented using a known transitive closure algorithm supporting parallelism, and the sweep phase where all entries are scanned could also easily be implemented by inspecting multiple regions in parallel, or dividing the entries e.g. by key ranges to work packets that are handled by different threads. It could also be implemented using recursion.

In the preferred embodiment, the mark flag (903) is a single bit. Each transitive closure computation is associated with a specific mark value which is computed when the closure computation starts. The preferred implementation only starts the transitive closure computation during an evacuation pause (preferably at the end of the evacuation pause) when the nursery is empty. If it was started at a time when the nursery was not empty, it might need to be implemented as a hybrid object-multiobject level closure, which would be more complicated. Any new multiobjects constructed while the transitive closure is running are created with the mark value of the currently running closure (with e.g. integer marks, a higher mark value could also be used). Using a simple bit of mark value makes computing the next mark value trivial: just toggle the bit.

In the description below, when we say that a multiobject is marked, we mean that its mark is set to the mark value of the current global closure computation. In the preferred implementation, all multiobjects that exist when the transitive closure starts will have the mark value of the previous transitive closure computation (since they survived it), and thus there is no need to clear the mark values.

The transitive closure computation in the preferred embodiment consists of the following steps (possibly running partially in parallel):

for any entries pointed to directly by roots (or implicit exits associated with roots), if the entry does not already have the mark of this closure computation, marking the entry, and if it has any exits, pushing it on the stack while there are entries on the stack, taking an entry from the stack, traverse all its exits, and for any exits, if the entry pointed to be the exit does not already have the mark of this closure computation, marking this second entry, and if it has any exists, pushing it on the stack It should be understood that the check if the entry has any exists is just an optimization, and not a mandatory element of the invention. Also, clearly the order of some operations could be changed.

The algorithm for performing the second step is illustrated in the simplified pseudocode below:

```
compute_closure( ) {
    while (stack not empty) {
        entry = stack[--stack_pointer];
        for (ex in all exits associated with entry) {
            entry2 = ex->value_entry;
            if (entry2->mark != closure_mark) {
                entry2->mark = closure_mark;
                if (entry2 has exits)
                    stack[stack_pointer++] = entry2;
            }
        }
    }
}
```

After the transitive closure computation is complete, any entries whose mark value differs from the mark value associated with the closure computation are unreachable (dead). It is thus preferable to do a sweep of all allocated entries (900), and check the mark value of each object. Any entry whose mark value indicates it was not reached can be freed. Thus, the transitive closure computation as used here is a way of determining which objects are live.

Alternatively, it is possible to put all entry objects on one of two doubly linked lists. At the start of the transitive closure, all objects are on one list. As the transitive closure computation changes the mark of an entry, the entry is moved to the other list. After the transitive closure computation has completed, any entry objects remaining on the first list can be freed, without having to sweep across all entry objects. The lists can then swap places for the next transitive closure to avoid any initialization of the lists. In practice, however, this method is likely to be slower and increases entry size.

It should be noted that there is a concurrency control issue between moving old objects and freeing objects by the transitive closure. The garbage collector could be in the process of moving an existing multiobject (that is part of a multi-region garbage cycle) when the transitive closure computation completes and frees the entries. Thus, a mechanism is needed for preventing the freeing of multiobjects while they are being moved.

A similar problem occurs if objects are freed by anything other than the transitive closure computation; then, an entry could get freed (and the memory space of the entry object reused for a new purpose) while it is on the stack of the transitive closure computation, causing it to refer to freed data.

These issues can be solved by a freeing means (314) that marshalls freeing of entries by using a small reference count (909). The reference count is initialized to one when a multiobject is created. Whenever an entry is put on the stack of the global closure, its reference count is incremented, and whenever an entry is popped off the stack, its reference count is decremented. Whenever the garbage collector starts copying an entry, its reference count is incremented, and when it is done copying it, its reference count is decremented. When the global closure wants to free a multiobject, it decrements its reference count. If in any case where the reference count is decremented it becomes zero, then the multiobject is known to be dead and can be freed immediately. The maximum possible reference count value used is three, so two bits suffice for representing it. It should be noted that in some embodiments it may be possible that the transitive closure runs twice while an entry is copied; in such cases, both transitive closure computations could detect an entry as dead, and only the first to complete should decrement its reference count. It should be understood that a constant could be added to all of the values while keeping the solution equivalent; such variants would just require more bits for representing the reference count. Likewise, incrementing or decrementing could be by arbitrary non-zero constant values, while still keeping the solution equivalent.

An actual implementation that runs concurrently with mutator and garbage collector execution would need to use locking or other synchronization mechanism to ensure consistency of the operations that access the tree (1104) of exits associated with an entry as well as the 'value_entry' field of an exit. Also, some synchronization is needed for the stack and stack pointer, as when the remembered set data structures are modified, entries may need to be pushed onto the stack by a different thread, as described above.

It should be understood that computing the transitive closure of the remembered sets is in many ways analogous to tracing the heap, which is a traversal of the object-level reachability graph. Thus, traversing or transitive closure on the object level is a well-known existing technique, whereas transitive closure on the multiobject remembered set level is a new technique. (Some distributed garbage collection algorithms also use a form of transitive closure computation on the reachability graph reported by individual nodes. None of the known algorithms operate on the multiobject level.)

Other Embodiments

Moving multiobjects is not a mandatory element of the present invention. In fact, the concept of an independently collectable region is entirely optional, even if soft real-time performance is to be achieved, because individual multiobjects can be moved, freed, and otherwise managed without the use of regions (other than nursery). It would even be possible to use the C function malloc( ) or its equivalent for allocating multiobjects anywhere in memory (in this case, assuming the multiobjects would never be moved, there would be no need to maintain the lists of referring exits (908)). This could be utilized for large object management and/or popular object management (it is possible to have some multiobjects that can be moved, and some that cannot be moved).

A pure mark-and-sweep system for multiobjects but using regions would need to maintain freelists or other data structures for keeping track of and allocating space from free areas left by freed multiobjects. Any known dynamic storage algorithm could be used, such as those surveyed in Wilson et al: Dynamic Storage Allocation: A Survey and Critical Review, IWMM'95, LNCS 986, pp. 1-116, Springer, 1995.

In the preferred embodiment of the invention, however, copying is used to compact memory. Compaction, or copying of old objects, is is beneficial in reducing TLB (Translation Lookaside Buffer) misses during mutator execution, which results in an overall application performance improvement even if it increases garbage collection costs. Thus, the preferred embodiment does not allocate from holes left by freed (multi)objects, but instead uses regions as the unit of free space management and uses copying to compact live multiobjects so that entire regions become empty and are then either freed or taken into other use, such as for allocating new objects or multiobjects from them. Allocation from such empty regions is very easy (maintain a pointer to the next free address, use it as the address of the next object or multiobject allocated, add the size of the thing allocated plus any applicable padding to the next free address value; such allocators also preferably maintain a limit value, and move to allocating from a different region when the limit is reached; alternatively to a pointer and limit pointer, offset and size can also be used).

It is also possible to implement determining which multiobjects are live by using any known variant of reference counting on the multiobject level (candidates including e.g. deferred reference counting, the Deutch-Bobrow algorithm, sticky reference counting, one-bit reference counting, a hardware-based reference counting method, cyclic reference counting, a weak-pointer algorithm, and a partial mark-and-sweep method). According to this invention, such a system would still involve a copying step to construct the multiobjects first, but could use reference counting therein and/or thereafter as the way of determining which (multi)objects are live. Another possible implementation would be a collector that uses reference counting for some individual objects, constructs multiobjects from some of them, and then uses reference counting on multiobject level to manage multiobjects. The transitive closure computation could also be used for periodically restoring approximate reference counts to exact values.

Applications of the Invention

A major application area for any garbage collection technique is the implementation of virtual machines (including e.g. Java virtual machines, C# virtual machines, Lisp environments (frequently utilizing interpreted byte code), Prolog environments (frequently implemented as Warren abstract machines, a kind of virtual machine)). A virtual machine aspect of the present invention includes a means for determining, in at least some situations, which objects in a nursery are live, a means for selecting some objects to be grouped together to form a multiobject, at least some of the groups thus formed containing more than one object, a means for constructing a multiobject by copying the objects selected to form the multiobject into consecutive memory locations in a specific order, a means for determining which multiobjects are live, and uses multiobjects in at least some memory management operations. Virtual machines are used for loading and executing application programs and serve as the run-time environment for them. The means for loading an application program typically involves reading its executable from disk and possibly compiling parts of it into directly executable machine-readable code, and the means for executing application programs typically involves a byte code interpreter (or word code interpreter), as well as the ability to call directly executable compiled native functions.

Another area of applications where the present invention provides significant benefits is implementation frameworks for intelligent systems. In the 1980's, many expert system shells, Lisp environments and logic programming environments were developed. It can be anticipated that significant advances will be made in intelligent systems during the next 20 years, and that specialized development framework products will be offered for their development. Such frameworks, especially ones targeted for very large knowledge bases (tens of gigabytes or more of main memory) and demanding applications would significantly benefit from the present invention. An intelligent system development framework according to the present system is a computer software product designed to facilitate the development of intelligent systems, the development framework including a means of determining which objects in a section of memory are live in at least some situations, a means for selecting some objects to be grouped together to form a multiobject, at least some of the groups thus formed containing more than one object, a means for constructing multiobjects by copying the objects selected to form the multiobject into consecutive memory locations in a specific order, a means for determining which multiobjects are live, and further utilizing multiobjects in at least some memory management operations. Such frameworks also typically include at least one theorem prover (a logical inference means, such as a resolution-based theorem prover for predicate logic) and a knowledge base (which may be stored in main memory or in non-volatile storage, the knowledge base advantageously utilizing the methods of this invention for managing its data). A knowledge base typically also contains a knowledge representation means for encoding common sense and/or application-specific knowledge into an internal representation understood by the logical inference means. Intelligent systems, whether developed with or without such frameworks, would benefit significantly from the present invention.

Future intelligent systems are likely to understand natural language to unprecedented depth, employing a deep knowledge base of real-world facts and conventions, and natural language parsing technologies placing much more emphasis on semantics and the information content of the expression than current natural language understanding systems. Such systems may use a commercial intelligent system development framework product to bring the elements of this invention into the intelligent system, or may implement some or all of the elements directly.

Machine translation systems in the future are likely to contain such deep natural language understanding and associated generation components. These components manipulate very large knowledge bases.

Collectively, systems employing natural language parsing technologies, semantic processing, natural language understanding, natural language generation, machine translation, information extraction, summarization, voice recognition, voice synthesis, and other related natural language technologies are called natural language processing systems in this specification.

Advanced natural language processing systems would be extremely valuable as components of providing various services to customers in telecommunications and computer networks. Such systems are typically implemented using clusters of computing nodes to provide the required scalability. Modern supercomputers are also implemented as clusters of relatively loosely coupled computing nodes generally solving different parts of the same problem or providing elements of a conceptually more or less unified service to customers.

In a clustered computing system (200) aspect of the present invention, at least one computing device (100) comprises a means of determining which objects in a section of memory are live in at least some situations, a means for selecting some objects to be grouped together to form a multiobject, at least some of the groups thus formed containing more than one object, a means for constructing multiobjects by copying the objects selected to form the multiobject into consecutive memory locations in a specific order, a means for determining which multiobjects are live, and further utilizing multiobjects in at least some memory management operations. In a preferred embodiment of such a clustered computing system all nodes contain the mentioned elements.

However, such systems may also contain computing nodes not necessarily including all these elements (201) such as storage nodes, nodes performing compute-intensive lower level tasks such as initial filtering of documents or information items based on coarse criteria, nodes directing such coarsely filtered information items to further analysis to a computing device (100); nodes analyzing and processing images; nodes performing OCR (Optical Character Recognition); nodes performing voice recognition; nodes generating voice output using DSP (Digital Signal Processing); nodes performing computer simulations or algorithmic optimization; or nodes performing Map-Reduce style computation.

Such nodes (201) may or may not perform any garbage collection and may or may not use the elements of this invention; however, they are important components of the entire clustered computing system (200). All the nodes in the clustered computing system would be connected together by an interconnection fabric (202).

In an advantageous embodiment of a clustered computing system according to this invention (200), at least some requests (1901) are received by computing nodes (201), which then requests a computing device (100) utilizing multiobject garbage collection to process at least some of the tasks implied by the request, as in FIG. 19. Alternatively, a computing device (100) utilizing multiobject garbage collection may receive a request (1901), and request at least parts of it to be processed by a computing node (201), as in FIG. 20. For example, such a clustered computing system could provide a basic level of services, e.g. related to simple data retrieval, using the computing nodes (201), and perform more advanced functionality such as deep linguistic analysis, information extraction, summarization, and translation on a computing device according to the present invention (100) that better supports providing such services, while still providing a single uniform interface to the end customers.

In this specification, the term computing node (201) is intended to refer to any computing system (comprising a processor element, a memory interface element, a memory element), but not necessarily containing all the elements of this invention. The term computing device (100) means a computing node is or implements an embodiment of this invention. Possible embodiments of the present invention include single-processor computing devices, multiprocessor shared-memory computing devices, clustered computing systems comprising at least two relatively independent computers (typically with no hardware shared memory, though shared memory simulated by software could be available), such computers falling under the definition of a computing node (201) and at least one also under the definition of a computing device (100); the term computing system refers to any of these, including clusters of computers when they operate collectively on some some task (e.g. on related problems, including the provision of related services).

Power consumption is particularly important in any mobile or portable device, as these devices are usually battery powered (or otherwise have very tight power budgets). The ability to determine which objects are live on the multiobject level is particularly important for these systems. A mobile computing device (2200) (FIG. 2) aspect of the present invention is a computing device with a battery (2201) (battery meaning any portable power source, including Li-Ion and other battery technologies, fuel cells, built-in generators, built-in solar cells, and comparable future power sources suitable for use as the primary power source of a mobile computing device), utilizing the garbage collection methods of this invention and preferably utilizing the transitive closure method for determining which multiobjects are live, as this method significantly reduces power consumption over conventional object-level SATB marking methods, as well as over non-incremental mark-and-sweep or copying collectors. A mobile computing device preferably also comprises a wireless communication interface (2202), such as GSM, 3G, WIMAX, WLAN, or other digital radio interface, or an infrared link.

A further aspect of this invention is a method for managing memory in a computer system, comprising: determining, in at least some situations, which objects in a nursery memory area are live; selecting some objects to be grouped together to form a multiobject, at least some of the groups thus formed containing more than one object; constructing a multiobject into consecutive memory locations in a specific order; determining which multiobjects are live; and utilizing multiobjects in at least some garbage collection operations. An method also comprises a method for representing remembered ses using entries (900) and exits (1000). A further aspect is a method which includes determining which multiobjects are live by performing a transitive closure computation on the multiobject level. A possible sequence of steps for performing such computation is shown in FIG. 16.

A further aspect of this invention is a method for reducing power consumption in a battery-powered mobile device (including those operated by fuel cells, solar cells, etc), comprising: determining, in at least some situations, which objects in a nursery memory area are live; selecting some objects to be grouped together to form a multiobject, at least some of the groups thus formed containing more than one object; constructing a multiobject into consecutive memory locations in a specific order; determining which multiobjects are live; utilizing multiobjects in at least some garbage collection operations; computing a transitive closure of the multiobjects reachable from roots; and freeing entries and associated multiobjects that were determined as unreachable during the transitive closure computation.

A further aspect of the present invention is a method for reducing memory bandwidth requirements of garbage collection, the method comprising: determining, in at least some situations, which objects in a nursery memory area are live; selecting some objects to be grouped together to form a multiobject, at least some of the groups thus formed containing more than one object; constructing a multiobject into consecutive memory locations in a specific order; determining which multiobjects are live; utilizing multiobjects in at least some garbage collection operations; copying at least some entire multiobjects comprising multiple objects using a memcpy-equivalent operation; computing a transitive closure of the multiobjects reachable from roots; and freeing entries and associated multiobjects that were determined as unreachable during the transitive closure computation.

A further aspect of the invention is a computer usable software distribution medium (2401) having a computer usable program code means (2402, 2403) embodied therein for causing garbage collection to be performed using multiobjects, the computer usable program code means in said computer usable software distribution medium comprising: computer usable program code means for determining, in at least some situations, which objects in the nursery are live; computer usable program code means for selecting some objects to be grouped together to form a multiobject, at least some of the groups thus formed containing more than one object; computer usable program code means for constructing a multiobject by copying the objects selected to form the multiobject into consecutive memory locations in a specific order; computer usable program code means for determining which multiobjects are live; and computer usable program code means for utilizing multiobjects in at least some memory management operations. The program (107) or essential components thereof can be loaded (installed) into a computer system from such computer usable software distribution medium for causing (configuring) the computer system to contain the elements and/or perform the steps described herein by using an auxiliary device (such as floppy drive, CD-ROM drive, USB port, network file server, web server) through a suitable interface (such as a floppy drive controller and cable, CD-ROM controller and cable, USB protocol and cable, a storage-area network, or a TCP/IP network) to read the computer usable program code means from the computer usable software distribution medium into the computer system. Examples of such media include magnetic disks, magnetic tapes, optical disks, non-volatile memories such as flash memory drives or sticks, volatile memory devices that are kept powered on for extended periods of time; in the future such media may also include e.g. crystal-based memories, three-dimensional memories, quantum computing memories, or nanotechnology based memories. It is the intention that this covers also media including copy protection, where a special code (such as a decryption key, activation key, serial number, smartcard or a dongle) is required before the computer readable program code embodied therein can be fully used.

It is not necessary for all embodiments of the invention to have all the advantages of the invention or fulfill all the purposes of the invention. The invention may also have other important benefits besides those listed herein.

DETAILED DESCRIPTION OF THE DRAWINGS

Figure 1:
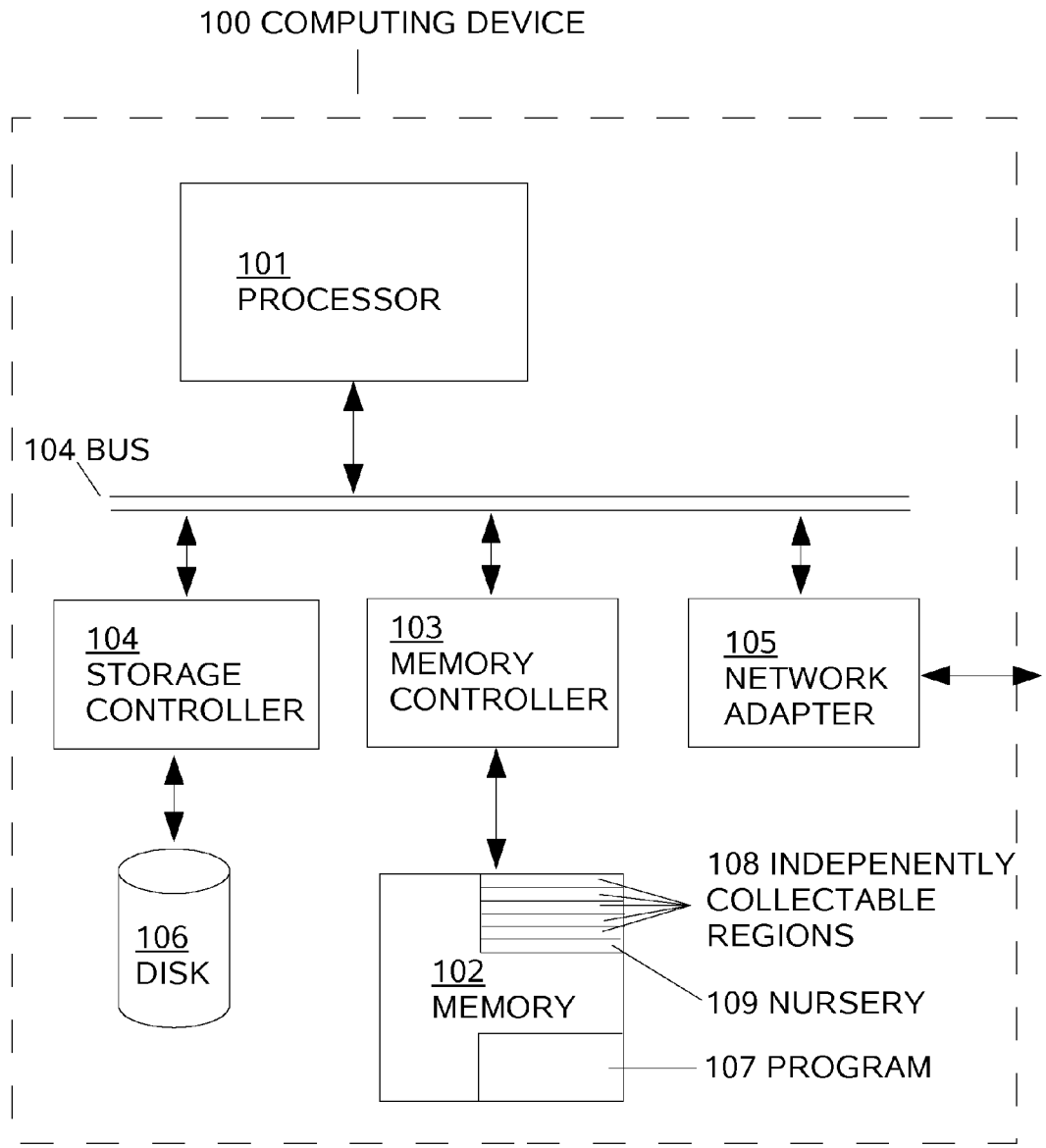
FIG. 1 is a schematic diagram of a computing device.

FIG. 1 is a schematic diagram of a computing device (100). A computing device comprises at least one processor (101)

(potentially several physical processors each comprising several processor cores), at least one memory device (102) (possibly several memory devices logically operating together to form a single memory space where application programs cannot distinguish which memory location is served by which memory device), at least one memory controller (103) (increasingly often integrated into the processor chip in modern high-end and embedded processors), an optional non-volatile storage controller (106) and associated non-volatile storage medium (107) such as magnetic disk, optical disk, semiconductor memory, or any other memory technology that may be developed in the future (including the possibility of supplying power to non-volatile memory chips for extended periods of time e.g. from a battery to emulate non-volatile memory), an optional network adapter (105) for communicating with the world outside the computing device, a bus connecting the various components (104) (actually, several buses, some internal to each processor and some external). The memory (102) comprises a program (107) as well as data areas including a young object area or nursery (109) and one or more independently collectable regions (108).

Even though today a computing system would be implemented using electronic circuitry (highly integrated in semiconductor chips), in the future other implementation technologies could be used, including but not limited to integrated optical circuitry, crystal-based memories, three-dimensional circuitry, nanotechnology based circuitry, or quantum computing technology.

Figure 2:
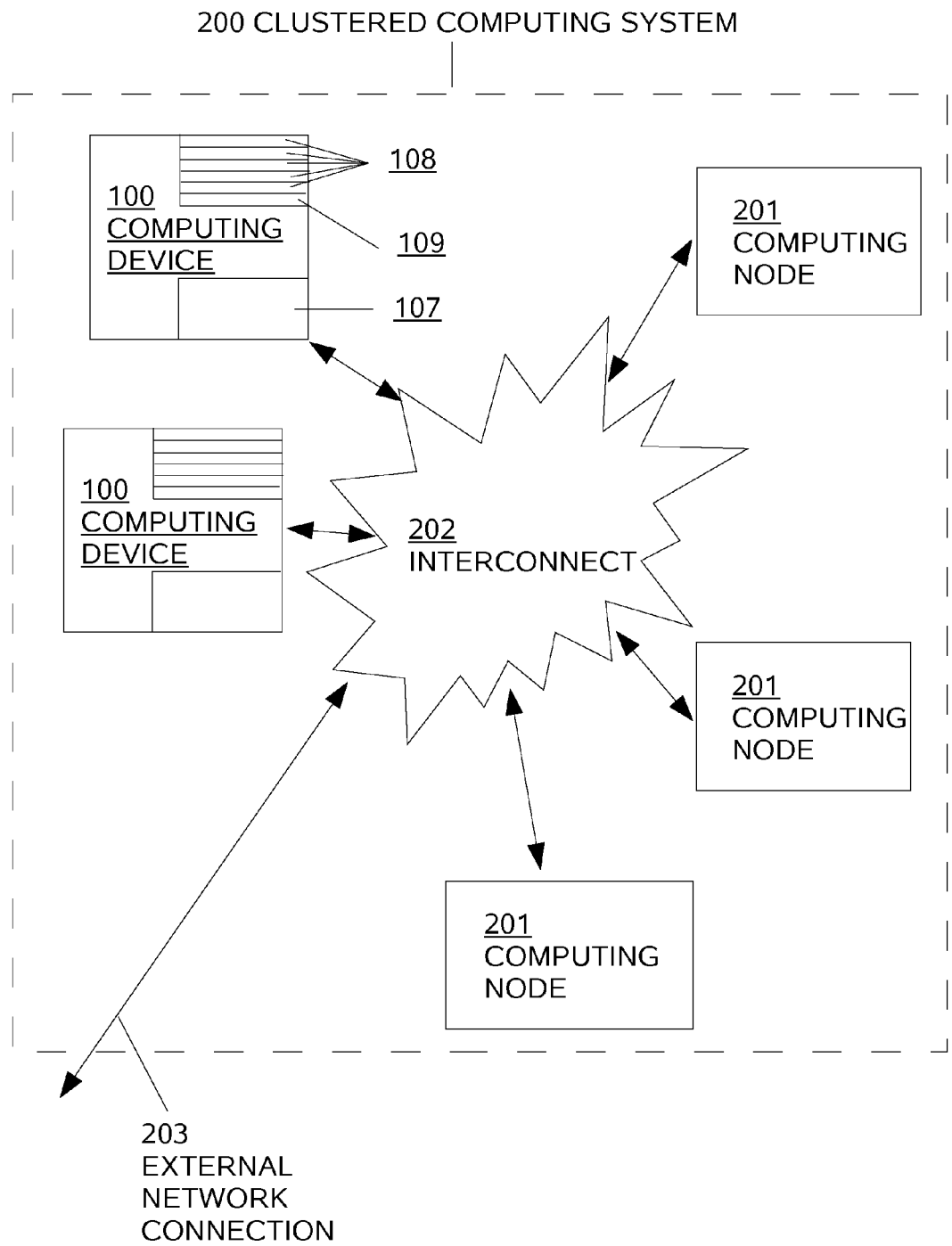
FIG. 2 is a schematic diagram of a clustered computing device.

FIG. 2 is a schematic diagram of a clustered computing system (200), comprising one or more computing devices (100), any number of computing nodes (201) (each computing node comprising a processor (101), memory (102), memory controller (103), bus (104), network adapter (105), and usually a storage controller (106) and non-volatile storage (107)), an interconnection fabric (202) and an external network connection (203). The interconnect (202) is preferably a fast TCP/IP network (though other protocols can also be used, such as gigabit ethernet, ten gigabit ethernet, ATM, HIPPI, FDDI, Infiniband, T1, E1, Sonet, WDM, microwave link), using any network topology (including but not limited to star, hypercube, hierarchical topology, cluster of clusters, and clusters logically providing a single service but distributed to multiple geographical locations to implement some aspects of the service locally and others by performing parts of the computation at remote nodes). A clustered computing system (200) may have more than one connection to the external world (203), originating from one or more of the computing nodes or from the interconnection fabric, connecting the clustered computing system to the external world. In Internet-oriented applications, the external connection(s) would typically be the channel whereby the customers use the services offered by the clustered computing system. In addition to a data-oriented protocol, such as TCP/IP, the clustered computing system may also have voice-oriented external network connections (such as telecommunications interfaces at various capacities, voice-over-IP connections, ATM connections, or radio channels such as GSM, EDGE, 3G, or any other known digital radio protocols; it is anticipated that many other protocols will be invented and deployed in the future). The same external network connections are also possible in the case of a single computing device (100).

It is also conceivable that entire clustered computing systems could be integrated as single chips or modules in the future (network processors and some specialized floating point processors are already taking this path).

It should also be understood that different levels of integration are possible in a computing system, and that the level of integration is likely to increase in the future. For example, many modern processors integrate the memory controller on the same chip with the processor cores in order to minimize memory latencies, and especially embedded processors already integrate some or all of the memory. Some systems, particularly mobile devices, utilize system-on-a-chip designs, where all components, including memory and communications, may be embedded on the same chip.

Figure 3:
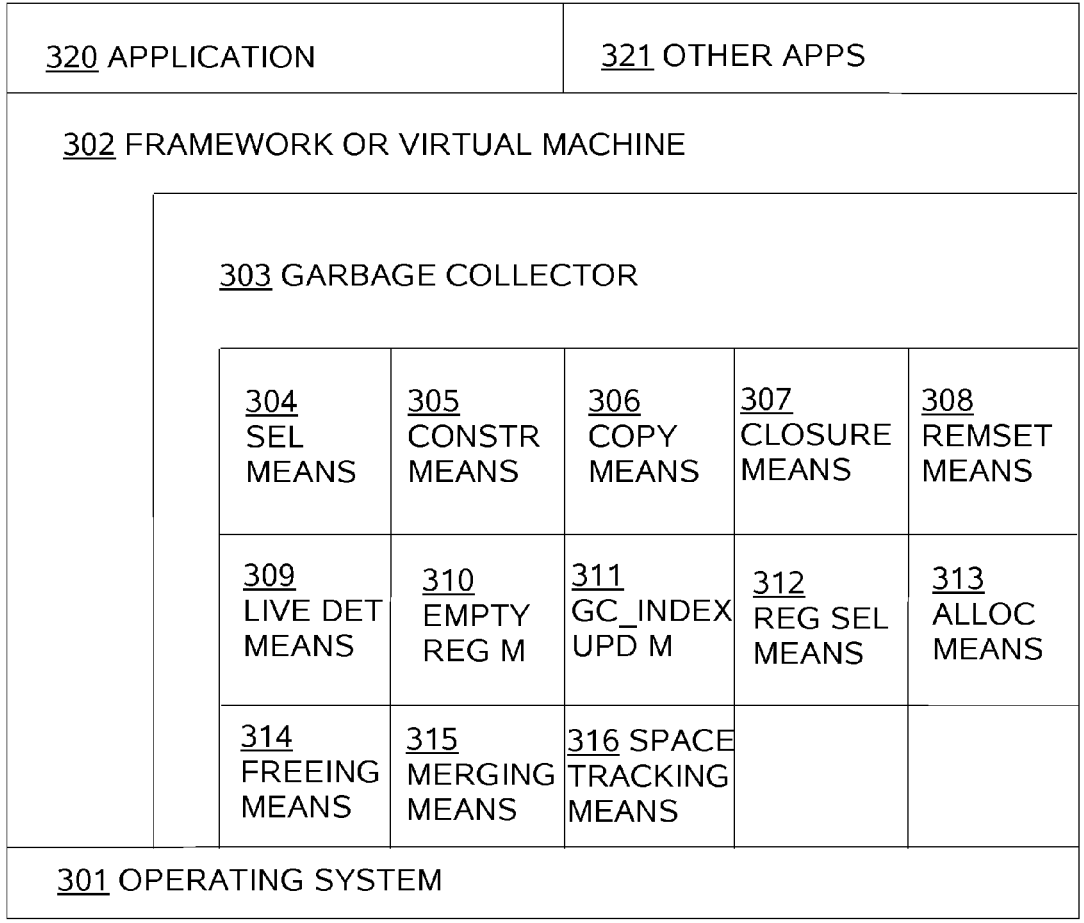
FIG. 3 is a schematic diagram of the programming of a computing device, according to a preferred embodiment.

FIG. 3 is a schematic diagram of the programming of a computing device, including a garbage collector. The program (107) is stored in the memory of the computing device (volatile or nonvolatile, read-write or read-only), and usually comprises at least one application program element (320), usually several supporting applications (321) that may even be considered part of the operating system, usually an operating system (301), and some kind of run-time framework or virtual machine (302) for loading and executing programs. The framework or virtual machine element (which, depending on how it is implemented, could be considered part of the application (320), part of the operating system (301), or a separate application (321)), comprises a garbage collector component (303), which comprises various means for implementing different aspects of the present invention. The selection means (304) implements selecting some objects to be grouped together to form a multiobject with at least some multiobjects containing multiple objects. The construction means (305) constructs multiobjects from live objects in the area currently designated as the nursery (109). The copy means (306) copies existing multiobjects as described in this specification. The closure means (307) computes the transitive closure of the reachability relation, preferably in parallel with mutator execution and evacuation pauses. The remembered set management means (308) manages remembered sets, either exactly or using an approximate method (overgeneralizing the reachability graph), to compensate for changes in roots and writes to multiobjects or the nursery. The liveness detection means (309) refers to methods of determining which objects or multiobjects are live in general (several ways of implementing it are described in this specification and the references). Empty region means (310) causes all objects to be moved out from certain regions, making the region empty, so that its memory area can be reused in allocation. Gc_index updating means (311) updates the value of gc_index (priority of scheduling garbage collection for a region) when objects are allocated, freed, moved, and/or when the transitive closure computation is run. The region selection means (312) selects which regions to collect in each evacuation pause. The allocation means (313) handles allocation of memory for multiobjects, e.g. from empty regions, from space vacated by freed regions in partially occupied regions, or e.g. using the malloc( ) or mmap( ) functions. The freeing means (314) takes care of freeing entries and their associated multiobjects, including dealing with race conditions between copying, transitive closure, and freeing. The merging means (315) implements merging existing multiobjects (e.g. to improve locality). The space tracking means (316) refers to tracking which areas of a region or multiobject are free after a multiobject has been freed or after a subtree in it has been made inaccessible by a write.

It should be noted that the entire programming of a computer system has been presented as the program (107) in this specification. In practice, the program consists in many cases of many relatively independent components, some of which may be installed, uninstalled or upgraded independently, and may be from different vendors. The elements of this invention may be present either in the software as a whole, or in one or more of such independently installable components that are used for configuring the computing system to perform according to the present invention, or in their combination.

The boundary between hardware and software is a flexible one, and changes as technology evolves. Often, in mass-produced goods more functionality is moved to hardware in order to reduce requirements on processor performance, to reduce electrical power requirements, or to lower costs. We have already seen special cryptographic primitives being added to mainstream general-purpose processors for speeding up specific (but frequently used) cryptographic operations. Given how prevalent virtual machine based computing has become, it seems likely that certain key operations in virtual machines, including some of the garbage collection related functionality, will be implemented with special hardware operations for supporting them in the future. For example, specialized processors (or system-on-a-ship components) could be developed that implement at least parts of the garbage collection functionality in hardware (various hardware collectors were explored and produced in the 1980s, e.g. for Lisp machines and specialized logic programming machines such as in the Japanese fifth generation computing project). While in the preferred implementation the program (107) is implemented entirely in software, the term "program" is intended to include also those implementations where at least parts of the garbage collector have been moved to hardware. In particular, the nursery garbage collection (especially the live object detection means (309), selection means (304) and the construction means (305)) could be implemented in hardware, as well as the fastpath (memcpy) variant of the copy means (306), and the closure means (307). Also, any write barrier inherent in the remset means (308) would be amenable to hardware implementation. (Other parts could also potentially be implemented in hardware.)

Figure 4:
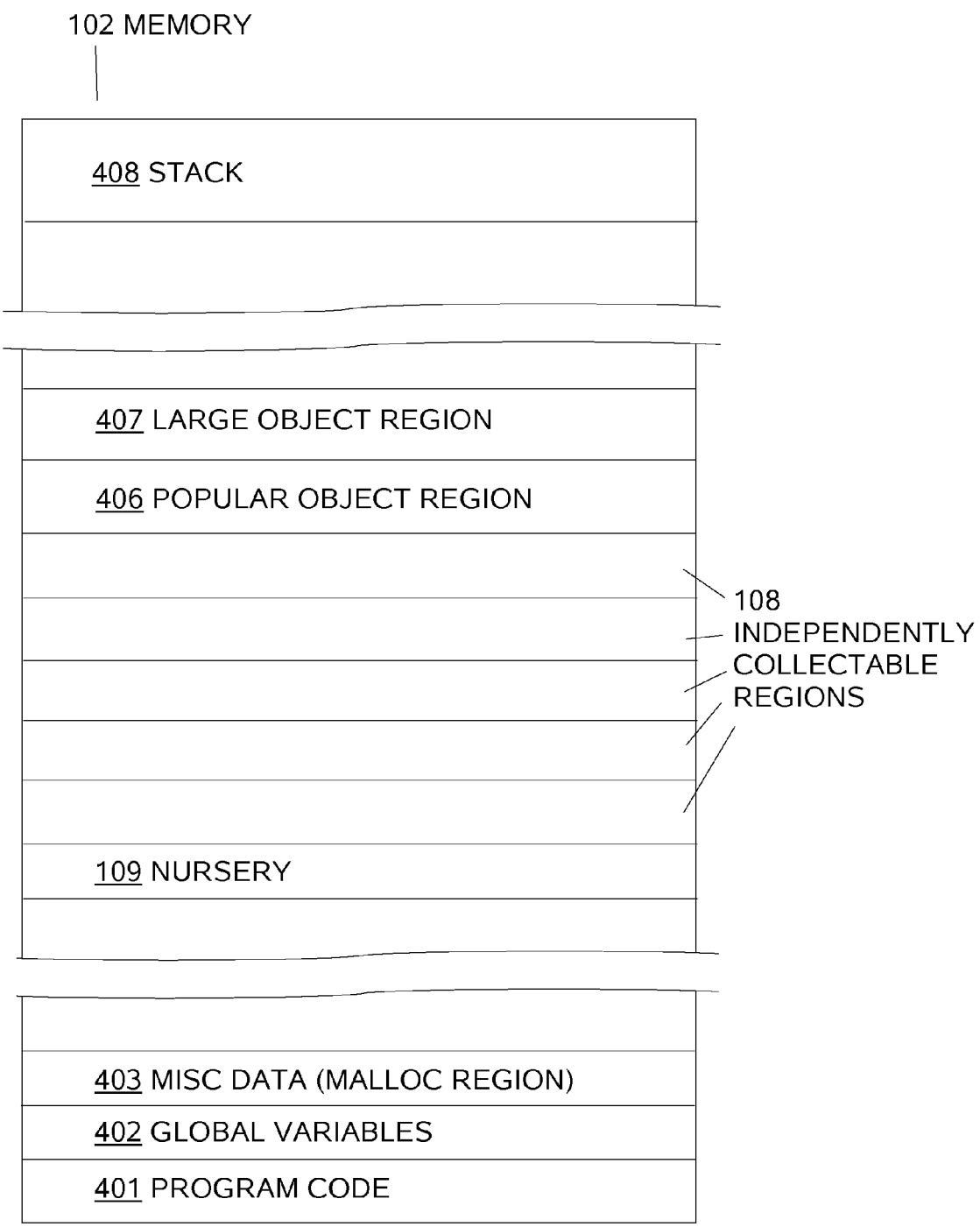
FIG. 4 illustrates an advantageous organization of the memory address space of a program.

FIG. 4 illustrates an advantageous organization of the memory (102) address space of a program. The program code (401) implements the software part of the program (107) (preferably all of it), global variables (402) are global variables of the program, miscellaneous data (403) represents the memory allocated by the brk( ) function in e.g. Linux and some malloc( ) implementations, the nursery (109) is the young object area (besides the term being used as a general designator for the area(s) from which multiobjects are constructed, here it would be a specific young object area in most embodiments, possibly comprising several distinguishable areas of relatively young objects), the independently collectable regions (108) (any number of them, from one to thousands or more) contain the multiobjects in this specification (parts of the area represented by the nursery (109) could also be collectable separately from each other, and there is no absolute requirement that the areas for storing individual objects would need to be distinct from the areas for storing multiobjects), the popular object region (406) comprises objects or multiobjects that have been selected to be considered popular (no exits are maintained for references to them, and thus they cannot easily be moved and garbage collecting them requires special methods if implemented), and the large object region (407) would typically be used to contain very large objects that would never be moved/copied. The stack (408) represents the main stack of the program; however, in practice there would usually be many stacks (one for each thread). The stack(s) may also store thread-local data.

Other important memory areas may also be present, such as those used for thread stacks, shared libraries, dynamic memory allocation, or the operating system kernel. Also, some areas may be absent or mixed with other areas (particularly the large object region and the popular object region).

FIG. 5 illustrates the grouping of objects into groups from which multiobjects will later be constructed. The object graph has one or more roots (501) that are intrinsically considered reachable (these typically include at least global variables, stack slots and registers of the program; some roots, such as global variables, are permanent (though their value may change), whereas others (e.g. stack slots) can appear and disappear rapidly). In the preferred embodiment, each root is a memory cell, and at least those roots that contain a pointer preferably have an exit data structure associated with them, the exit considered intrinsically reachable (these special exits are represented by (701) in FIG. 7). The individual objects (502) (of varying sizes) form an object-level graph. Selection of which objects to group together is illustrated by the boundaries drawn with dotted lines; these are the groups from which multiobjects (504) will be constructed.

FIG. 6. illustrates the multiobjects constructed from the objects and groups in FIG. 5. Again, the roots are labeled by (501), and the circles represent multiobjects (504) in contiguous memory (see also (800) in FIG. 8). This is, in effect, a multiobject-level graph for the same objects as in FIG. 5. The references (602) between multiobjects are actually represented in two ways in the preferred embodiment: as an object-level pointer (so that mutators don't need to be modified for or be aware of the implementation of garbage collector) and a remembered set level pointer (the value_entry (1006) field of an exit (1000)).

The graph in this example was very simple, each multiobject containing only a few objects. In practical systems, a multiobject could contain from one to several thousand individual objects (typically many). Thus, moving from an object-level reachability graph to a multiobject-level reachability graph can reduce the complexity of the graph (the number of nodes and edges) by several orders of magnitude.

FIG. 7 illustrates the remembered set structure (entries and exits) for the multiobjects in FIG. 6 in the preferred embodiment (not showing the refexits list for clarity). The root exits (701) are associated each with a root containing a pointer, the entries (900) are each associated with a multiobject (though generally also objects in a young object area can have entries), and the exits (1000) link entries to other entries referenced by each entry (each entry may contain any number of such references, and thus multiple exits). Even though the exits are drawing within each entry in the figure, they are preferable separate data items, as illustrated in FIG. 11.

FIG. 8 illustrates the preferred layout of a multiobject in a contiguous memory area (800) after it has been constructed. The multiobject begins with its root object (801), followed by other objects (802) in a specific order. The objects are stored in contiguous memory locations when the multiobject is created (except for small amounts of padding (804) typically used to ensure proper alignment), and certain metadata (803), such as a bitmap indicating which cells in the multiobject contain internal pointers (i.e., pointers pointing to non-root objects within the same multiobject).

FIG. 9 illustrates the contents of the entry data structure (900). This is typically a "struct" or "class" in most programming languages. The key (901) can be used to determine (compute) the starting address of the multiobject in memory; preferably it is the starting address. The size (902) can be used to determine (compute) the size of the multiobject in memory in bytes, cells, or other suitable units; preferably it is the size in cells excluding the metadata (803). Mark (903) is used by the transitive closure computation to indicate whether the entry has been visited. The left (904) and right (905) fields represent auxiliary data for implementing the entry tree (1102). The num_exits (906) and exits_root (907) represent fields used to implement (contain) the exit tree (1104). The refexits (908) field represents the doubly linked list on which exits referring to each entry are preferably placed (it is a pointer to the first exit on the list). The refcnt (909) field represents the reference count used for marshalling freeing of entries (there could possibly be a second reference count if a reference count were used instead of transitive closure computation for determining which multiobjects are free).

FIG. 10 illustrates the contents of the exit data structure (1000). This is typically a "struct" or "class" in most programming languages. The address (1001) can be used to determine (compute) the starting address of the cell containing the pointer that points out from the multiobject that this exit refers to (preferably, it is just the address of the pointer). The left (1002) and right (1003) fields represent auxiliary data used for implementing the exit tree (1104). The next (1004) and (1005) fields represent the next and previous pointers for implementing the doubly linked list of exits referring to each entry (908). The value_entry field (1006) represents a pointer to the entry for the multiobject (or object, if it has not yet been made part of a multiobject) that the pointer that this exit is associated with refers to. Preferably, it is an index to a two-level array containing all exits, with higher bits used to index the first level and lower bits the second level.

FIG. 11 illustrates how entries (900) are attached to individually collectable regions (405) using an index data structure (1102) and exits (1000) to entries (900) using a second index data structure (1104) in the preferred embodiment. The figure does not show the refexits (908) lists for clarity.

FIG. 12 contains flowcharts and data illustrating a means of managing remembered sets inexactly (overgeneralizing). When writing to a multiobject (1201), an entry would be looked up (possibly returning the containing entry of the referred object) or created for the new value (1202), and the entry added to the list (1203). When copying a region (1221), the region's remembered data structures would be brought up to date (1222) (actually, the region's where the data is copied to), and the list of added references is cleared (1223). When computing a transitive closure (1211), the list of added references (1230) is taken as (potentially) referenced by the entry (1212) and pushed to stack (1213).

FIG. 13 illustrates the overall construction of multiobjects from a nursery memory area (as defined in the specification) in the preferred embodiment. While the steps can be performed in various orders and possibly concurrently, they are illustrated herein as a sequential process. The first step is to identify root objects (1301), then determine the size of each multiobject (1302), and then loop over all multiobjects for which we identified roots with the termination test testing whether there are more multiobjects (1303), and allocating space for a multiobject (1304), coping the objects into it (1305), initializing its metadata such as the internal pointer bitmap (1306), and updating referring pointers (1307) for each. At the end, all remaining objects in the nursery are dead (1307) (in the preferred embodiment, but not in all embodiments).

FIG. 14 illustrates copying of objects into a multiobject when space has been allocated for the entire multiobject in advance. First, get the size of the multiobject (1401) (or compute if not already done), then allocate space for the entire multiobject (1402), save the starting address in a variable P (1403), and for all objects (always at least one), copy the object to the address in P (1404), update the referring cell to P (with proper tags, if applicable) (the referring cell means the cell that contains the pointer to this object; for the initial object, it is some variable that will become the entry's key (901); for other objects, it is the cell in the new copy of a previously traced object that points to the current object (there can be only one such cell, and its address is readily available from the tracing algorithm as well known in the art (basic copying collectors in e.g. in Jones & Lins provide the model); then add the size of the object and any applicable padding to the variable P (1406), and recurse into cells of the current object (1407) (in practice, recursing could mean pushing the current context on a stack and creating a new context for tracing the new copy of the current object; such recursion elimination techniques are well known in the art). The test (1408) checks if there are any more objects that should be traced (either in the current context or in contexts on the stack).

FIG. 15 illustrates copying of objects into multiobject(s) when space is allocated for each object separately. It comprises the steps of determining the size of the current object (1501), checking if there is space in the current allocation region (GCLAB) for allocating a copy of the object (1502), completing the current multiobject (1503) and allocating a new GCLAB (not shown), and starting a new multiobject for each cell not yet processed in the trace stack (1504) (but not necessarily for their subobjects), copying the object to the current allocation address P in the current GCLAB (1505), updating the referring cell (1506), updating the allocation address in the current GCLAB (1507), and recursing into cells referenced by the current object (1508). While objects remain to be traced (1509), we repeat the process. When the stack is empty, the current multiobject is complete (1510).

FIG. 16 illustrates the steps of computing the transitive closure in the preferred embodiment (for the transitive closure computation) and a doubly linked list based method of freeing unreachable multiobjects (which is an alternative to the simpler preferred embodiment). First we compute a mark value for this closure and set a flag indicating a closure is running (1601), then mark and push all entries directly referenced by roots on the stack (unless already marked, and preferably only if they have exits) (1602), repeating this for all roots (1603); if while entries remain in the stack (1604), we pop an entry from the stack (1605), and for all its exits (1606), we mark and push the value_entry (1006) on the stack (1607), unless it has already been marked with the mark of this closure (and preferably only if it has exits). In the described embodiment, each time we mark an entry we also move it from a first doubly linked list (initially containing all entries) to a second doubly linked list (not shown in the figure due to lack of space). After the stack is empty, we clear the flag indicating that a closure is running (1608), and for all entries remaining on the first doubly linked list (1609), take (remove) the entry from the list (1610), decrement its refcnt (1611), and if the reference count becomes zero (1612), free the entry and its associated multiobject (1613) and update the region's gc_index (1614). (Alternatively, gc_index updating could be done e.g. after all unreachable entries have been freed.)

FIG. 17 illustrates ultra-fast copying of an existing multiobject using memcpy and updating its internal pointers and exits. First we allocate space for the entire multiobject (1701) using its size (902), then copy its data to the new location using memcpy (1702), add the difference of its new and old memory addresses to each cell in the new copy containing an internal pointer, as indicated by the metadata (803), and finally add the difference of its new and old memory addresses to the address (1001) of all exits contained in its exit tree (1104).

FIG. 18 illustrates merging several existing multiobjects into one or several new multiobjects. First the merge target is selected (1801) and the object that are to be merged into it (1802) (sometimes it may be beneficial to first select the objects to be merged and then elect a merge target), then designate them as the nursery (1803) (this means that we do the later multiobject construction steps as if the objects being merged and the merge target were the nursery, rather than using the young object area as the nursery), construct a new multiobject whose root is the root of the merge target multiobject (1804), and while any objects remain (1805) (e.g. because the resulting multiobject was too big), select any object directly pointed by an already constructed multiobject as the root of the next multiobject (1806), and construct that multiobject (1807). In the preferred embodiment, merging is only done when it can be determined that the merge will not result in a multiobject that exceeds the maximum size of a multiobject.

FIG. 19 illustrates a clustered computing system where a frontend operates without all the elements of this invention but parts of the service provided to users is implemented by sending a request to a computing device employing aspects of this invention. A client sends a service request (1901) to one of the computing nodes (201) in the clustered computing system, which may make some processing on it, and then sends at least part of it (or a different request derived from it) to a computing device (100) comprising the program (107), regions (108) and nursery (109), which thus processes at least a part of the client's original request, and sends results to the computing node (201) (or another computing node or device) for merging with other results or sends the result directly to the client.

FIG. 20 illustrates a clustered computing system where a frontend computing device (employing aspects of this invention) implements certain parts of the service provided to users by sending requests to simpler computing nodes that do not themselves contain all the elements. A client sends a service request (1901) to one of the computing devices (100), comprising the program (107), regions (108) and nursery (109), which may make some processing on it, and then sends at least part of it (or a different request derived from it) to a computing node (201), which thus processes at least part of the client's original request, and sends results to the computing device (100) (or another computing node or device) for merging with other results or sends the result directly to the client.

FIG. 21 illustrates the basic elements of a garbage collection method according to the present invention. The garbage collection methods comprises, in any order and possibly concurrently, the steps of determining which objects are live (2101), selecting some objects to group together as a multiobject (2102), constructing the multiobject from those objects (2103), determining which multiobjects are live (2104), and utilizing multiobjects in at least some memory management operations (2105).

FIG. 22 illustrates the mobile computing device (2200) aspect. The mobile computing device comprises at least one processor (or processor core) (101), at least one memory element (102) comprising the program (107), at least one independently collectable region (108) and a nursery (109), at least one memory controller (103), at least one bus (104), at least one storage controller (106) (possibly the same as the memory controller (103)), non-volatile storage (107), a battery or other power source suitable for mobile devices (2201), and optionally a wireless communication interface (2202). In mobile devices, the various components are preferably optimized for low power consumption. Many mobile devices also comprise an integrated display and a keyboard. It is common for several of the components listed to be integrated into the same semiconductor chip in mobile devices.

FIG. 23 illustrates the intelligent system (2301) aspect of the present invention. The system comprises a logical inference means (2303), a knowledge base means (2304), and typically a virtual machine or other framework (302), which comprises a garbage collector (303) as described in FIG. 3 and a means for loading (2305) and executing (2306) application programs. An intelligent system may be implemented in either software or hardware. It may also comprise a sensor means or an actuator means for mobility (not shown).

FIG. 24 illustrates a preferred embodiment of a computer usable software distribution medium (2401). The medium has a computer usable program code means embodied therein (2402) for causing garbage collection to be performed using multiobjects. The computer usable program code means (2402) comprises a computer usable program code means for performing garbage collection (2403), which comprises computer readable program code means for performing the various steps in FIG. 21 (2101, 2102, 2103, 2104, 2105) (not shown in FIG. 24).

What is claimed is:

1. A method for managing memory in a computing system, comprising:
   determining, by a garbage collector in a computing system, which objects in a nursery memory area are live,
   selecting at least two of the determined live objects to be grouped together to form a multiobject,
   constructing the multiobject by copying the objects selected to form the multiobject into consecutive memory locations,
   determining which constructed multiobjects are live,
   utilizing at least one constructed multiobject in at least one memory management operation, wherein the memory management operation comprises at least one of
      freeing a multiobject constructed in said step of constructing; and
      copying a multiobject constructed in said step of constructing.

2. The method of claim 1, wherein determining which constructed multiobjects are live includes performing a transitive closure computation on the multiobject level.

3. A computer usable software distribution medium (2401) having computer usable program code means (2402,2403) embodied therein for causing garbage collection to be performed using multiobjects, the computer usable program code means in said computer usable software distribution medium comprising:
   a non-transitory computer usable software distribution medium having computer readable program code means embodied therein for causing garbage collection to be performed by a computer using multiobjects, the computer usable software distribution medium comprising;
   computer usable program code means for causing the computer to determine which objects in a nursery memory area are live;
   computer usable program code means for causing the computer to select at least two of the determined live objects to be grouped together to form a multiobject;
   computer usable program code means for causing the computer to construct the multiobject by copying the objects selected to form the multiobject into consecutive memory locations;
   computer usable program code means for causing the computer to determine which constructed multiobjects are live; and
   computer usable program code means for causing the computer to utilize at least one constructed multiobject in at least one memory management operation, wherein the memory management operation comprises at least one of:
freeing a constructed multiobject; and
copying a constructed multiobject.

4. A computing system comprising:
a garbage collector (303) comprising:
a liveness detection means (309) for determining which objects in a nursery memory area are live, and further for determining which constructed multiobjects are live;
a selection means (304) for selecting at least two of the determined live objects to be grouped together to form a multiobject;
a construction means (305) for constructing the multiobject by copying the selected objects into consecutive memory locations; and
at least one multiobject-level memory management operation means for utilizing at least one constructed multiobject in at least one memory management operation, the memory management operation means comprising at least one of
a freeing means (314) for freeing a multiobject constructed by the construction means (305); and
a copy means (306) for copying a multiobject constructed by the construction means (305).

5. The computing system of claim 4, wherein the garbage collector is further configured to maintain remembered sets on multiobject level, the maintenance comprising:
associating with each multiobject an entry (900), the entry comprising at least information from which the starting address of the multiobject can be determined and information from which the size of the multiobject can be computed;
associating with each multiobject a set of exits (1000), each exit comprising at least information from which the memory address (1001) that the exit is associated with can be determined and a pointer to the entry that the pointer at the address associated with the entry refers to (1006); and
maintaining for each entry (900) a data structure (1104) containing the exits (1000) associated with that entry.

6. The computing system of claim 4, wherein at least one memory area is designated to constitute the nursery for the purposes of multiobject construction, the construction means being further configured to:
identify which objects are to be roots of multiobjects;
determine the size of each multiobject being constructed;
allocate memory space for each multiobject being constructed;
copy objects belonging to each multiobject to the allocated space; and
update references to the root object of the multiobject to be references to the multiobject in its allocated location.

7. The computing system of claim 6, where the construction means is further configured to initialize a bitmap that indicates which cells of the multiobject are internal pointers and utilize the bitmap in at least one multiobject copying operation.

8. The computing system of claim 6, wherein the construction means is further configured to copy the objects into the allocated space in left-to-right depth first order.

9. The computing system of claim 6, wherein the construction means is further configured to copy the objects into the allocated space in right-to-left depth first order.

10. The computing system of claim 4, wherein determining which constructed multiobjects are live includes performing a transitive closure computation on the multiobject level.

11. The computing system of claim 10, wherein the garbage collector is configured to free entries that were determined to be unreachable during the transitive closure computation by:
during the transitive closure computation, moving reachable entries from a first doubly linked list initially containing all entries to a second doubly linked list, and
after the transitive closure computation is complete, freeing entries and associated multiobjects remaining on the first list.

12. The computing system of claim 4, wherein the garbage collector further comprises a means for marshalling freeing of entries, the means configured to:
when an entry is allocated, initialize its reference count to one;
whenever an entry is put on the stack of the transitive closure computation, increment its reference count;
whenever an entry is popped from the stack of the transitive closure computation, decrement its reference count;
whenever a multiobject is selected to be moved, increment the reference count of its corresponding entry;
whenever moving a multiobject is complete, decrement the reference count of its corresponding entry;
whenever it is first determined that an entry is dead, decrement its reference count; and
whenever the reference count of an entry reaches zero, free the entry and any associated multiobject.

13. The computing system of claim 4, wherein the garbage collector further comprises a moving means for moving a multiobject to a new location.

14. The computing system of claim 13, wherein the moving means is configured to:
allocate space for the entire multiobject in a new location, and
copy the bits representing the multiobject to a new location.

15. The computing system of claim 14, wherein the moving means is further configured to adjust internal pointers in the moved multiobject by adding the difference of the new and old locations to them.

16. The computing system of claim 14, wherein the moving means is further configured to update the addresses associated with exits from the multiobject by adding the difference of new and old locations to them.

17. The computing system of claim 13, wherein the moving means is further configured to reconstruct the multiobject by copying any live objects in it to a new memory area that becomes the new copy of the multiobject.

18. The computing system of claim 4, wherein the garbage collector further comprises a merging means (315) for merging a plurality of multiobjects into one multiobject.

19. The computing system of claim 18, wherein the merging means is configured to:
designate one of the multiobjects as the merge target into which the other multiobjects are to be merged;
select one or more other multiobjects that are to be merged into the merge target multiobject; and
construct a new multiobject from live objects within the multiobjects being merged, using the root object of the merge target as the root of the new multiobject.

20. The computing system of claim 19, wherein the merging means preserves the identity of the merge target.

21. The computing system of claim 4, wherein the garbage collector further comprises a means for keeping track of and allocating space from freed multiobjects, the tracking means being capable of managing a plurality of free memory areas within a memory region and allocating space for multiobjects from such free areas.

22. The computing system of claim 4, further comprising a plurality of computing devices (100), connected by an interconnection fabric (202), the computing devices being configured to act collectively on related problems as a clustered computing system (200).

23. The computing system of claim 4, further comprising at least one computing device (100) and a plurality of computing nodes (201), connected by an interconnection fabric (202), wherein at least one computing node (201) is configured to receive a request (1901), and as a result of receiving the request, send at least one further request to a computing device (100), whereby at least some of the tasks implied by the original request are performed by the computing device (100).

24. The computing system of claim 4, further comprising at least one computing device (100) and a plurality of computing nodes (201) connected by an interconnection fabric (202), wherein at least one computing device (100) is configured to receive a request (1901), and as a result of receiving the request, send at least one further request to a computing node (201), whereby at least some of the tasks implied by the original request are performed by the computing node (201).

* * * * *